US010091778B2

(12) United States Patent
Asterjadhi et al.

(10) Patent No.: US 10,091,778 B2
(45) Date of Patent: Oct. 2, 2018

(54) RANDOM ACCESS RESOURCE UNIT ALLOCATION FOR A MULTIPLE BSSID NETWORK

(71) Applicant: QUALCOMM Incorporated, San Diego, CA (US)

(72) Inventors: Alfred Asterjadhi, San Diego, CA (US); James Cho, Mountain View, CA (US); George Cherian, San Diego, CA (US); Simone Merlin, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 40 days.

(21) Appl. No.: 15/482,679

(22) Filed: Apr. 7, 2017

(65) Prior Publication Data

US 2017/0303245 A1    Oct. 19, 2017

Related U.S. Application Data

(60) Provisional application No. 62/322,772, filed on Apr. 14, 2016.

(51) Int. Cl.
| | |
|---|---|
| *H04W 72/04* | (2009.01) |
| *H04L 12/26* | (2006.01) |
| *H04W 72/10* | (2009.01) |
| *H04W 84/12* | (2009.01) |
| *H04W 74/08* | (2009.01) |

(52) U.S. Cl.
CPC ....... *H04W 72/042* (2013.01); *H04L 43/0894* (2013.01); *H04W 72/04* (2013.01); *H04W 72/10* (2013.01); *H04W 74/08* (2013.01); *H04W 84/12* (2013.01)

(58) Field of Classification Search
CPC ... H04W 72/042; H04W 72/04; H04W 72/10; H04L 43/0894
See application file for complete search history.

(56) References Cited

U.S. PATENT DOCUMENTS

| | | | | |
|---|---|---|---|---|
| 2015/0139209 | A1* | 5/2015 | Park | H04W 74/08 370/338 |
| 2015/0280953 | A1* | 10/2015 | Porat | H04L 27/2602 370/330 |

FOREIGN PATENT DOCUMENTS

WO    WO-2017005893 A1    1/2017

OTHER PUBLICATIONS

International Search Report and Written Opinion—PCT/US2017/026809—ISA/EPO—dated Jul. 21, 2017.

* cited by examiner

*Primary Examiner* — Siming Liu
(74) *Attorney, Agent, or Firm* — Paradice and Li LLP

(57) ABSTRACT

An access point (AP) may prioritize the allocation of uplink resources between multiple basic service sets (BSSs). In some aspects, the AP may select one of a plurality of BSSs, may allocate one or more random resource units (RUs) to only the selected BSS, and may transmit a frame indicating the allocation of the one or more random RUs to the selected BSS. Wireless devices belonging to the selected BSS may contend for access to the random RUs allocated by the frame, and then transmit uplink data using the random RUs.

30 Claims, 13 Drawing Sheets

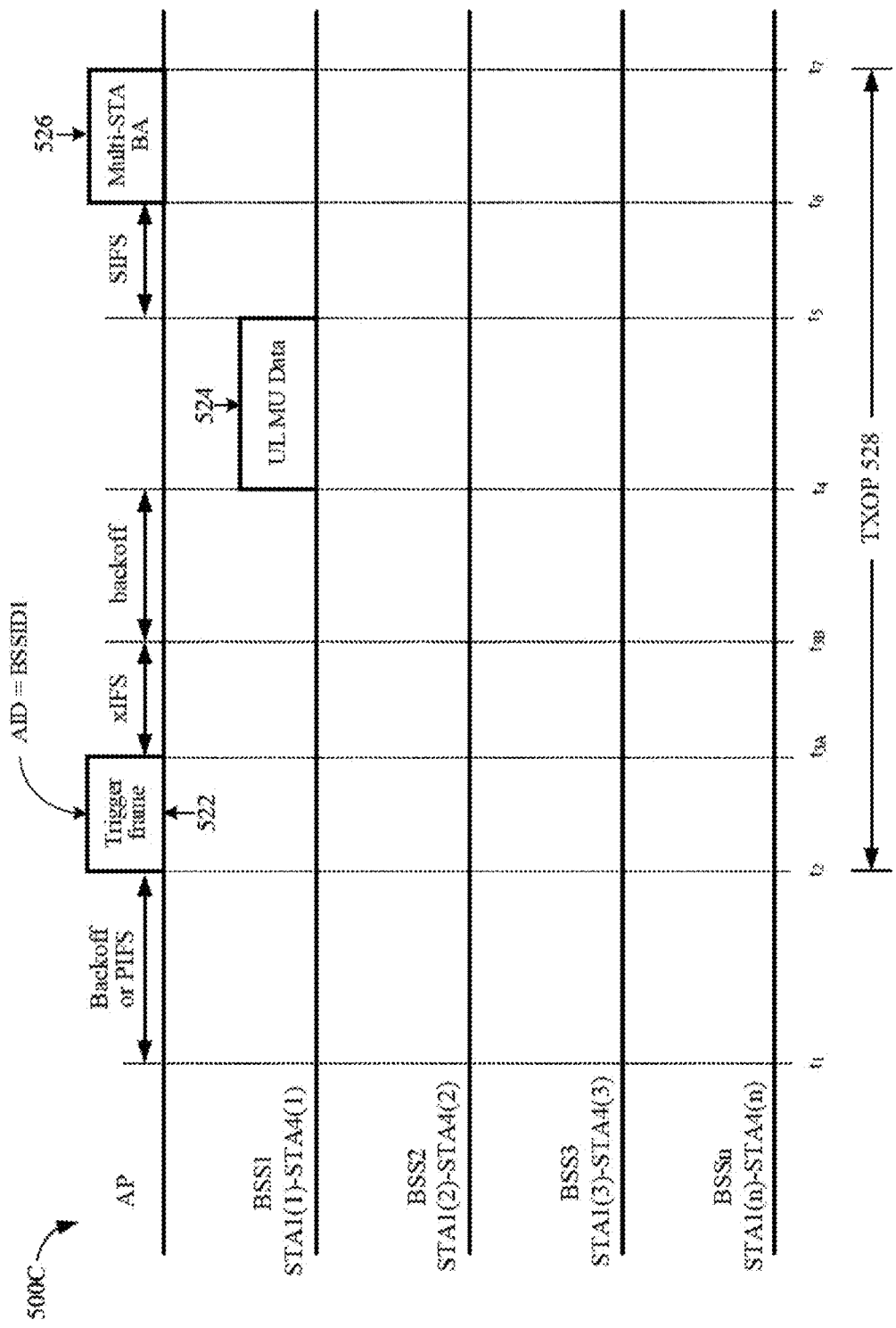

| 701 | 702 | 703 | 704 | 705 | 706 |
|---|---|---|---|---|---|
| Length | Cascade Indication | HE-SIG-A Info | CP and LTF Type | Trigger Type | Trigger-dependent Common Info |

| 711 | 712 | 713 | 714 | 715 | 716 | 717 |
|---|---|---|---|---|---|---|
| User Identifier | RU Allocation | Coding Type | MCS | DCM | Spatial Stream Allocation | Trigger-dependent Per User Info |

RANDOM ACCESS RESOURCE UNIT ALLOCATION FOR A MULTIPLE BSSID NETWORK

CROSS-REFERENCE TO RELATED APPLICATION

This application claims the benefit of commonly owned U.S. Provisional Patent Application No. 62/322,772 entitled "RANDOM ACCESS RESOURCE UNIT FOR A MULTIPLE BSSID NETWORK" filed on Apr. 14, 2016, the entirety of which is hereby incorporated by reference.

TECHNICAL FIELD

This disclosure relates generally to wireless networks, and specifically to allocating resource units in wireless networks.

DESCRIPTION OF THE RELATED TECHNOLOGY

A wireless local area network (WLAN) may be formed by one or more access points (APs) that provide a shared wireless medium for use by a number of client devices or stations (STAs). Each AP, which may correspond to a Basic Service Set (BSS), may periodically broadcast beacon frames to enable any STAs within wireless range of the AP to establish and maintain a communication link with the WLAN. WLANs that operate in accordance with the IEEE 802.11 family of standards are commonly referred to as Wi-Fi networks.

An AP may create and operate multiple BSSs at the same time, and may assign a number of wireless devices to each of the BSSs. Each of the multiple BSSs may operate independently of each other and yet use the same AP. Because different BSSs may include different numbers of wireless devices, may have different security parameters and access privileges, and may include different types of wireless devices (such as IoT devices, Wi-Fi devices, and so on), it may be desirable for the AP to prioritize the allocation of resources between multiple BSSs.

SUMMARY

The systems, methods and devices of this disclosure each have several innovative aspects, no single one of which is solely responsible for the desirable attributes disclosed herein.

One innovative aspect of the subject matter described in this disclosure can be implemented in a wireless network to prioritize the allocation of resource units (RUs) between multiple basic service sets (BSSs) for uplink data transmissions. In some implementations, an access point (AP) can include one or more processors and a memory storing instructions. The instructions can be executed by the one or more processors to cause the AP to select a number of basic service sets (BSSs), to allocate one or more random RUs to each of the selected BSSs, and to transmit a frame indicating the allocation of the one or more random RUs to each of the selected BSSs. In some aspects, the number of BSSs may be a subset of a plurality of BSSs operated or controlled by the AP. The frame can be a trigger frame including one or more association identification (AID) values identifying the selected BSSs. In some aspects, the one or more AID values can be stored in a per user information field of the trigger frame.

In some implementations, selection of the number of BSSs can be based on at least one of: security parameters of the plurality of BSSs, access privileges of wireless devices belonging to the plurality of BSSs, types of wireless devices belonging to the plurality of BSSs, quality of service (QoS) parameters of the plurality of BSSs, and delay requirements of wireless devices belonging to the plurality of BSSs. In other implementations, a size of the one or more random RUs can be based at least in part on a bandwidth of a number of wireless devices belonging to the selected BSSs.

Another innovative aspect of the subject matter described in this disclosure can be implemented as a method. The method can include selecting a number of basic service sets (BSSs) from a plurality of BSSs, wherein the selected number of BSSs is a subset of the plurality of BSSs; allocating one or more random resource units (RUs) to each of the selected BSSs; and transmitting a frame indicating the allocation of the one or more random RUs to each of the selected BSSs.

Another innovative aspect of the subject matter described in this disclosure can be implemented in a non-transitory computer-readable medium. The non-transitory computer-readable medium can comprise instructions that, when executed by one or more processors of an AP, cause the AP to perform operations including selecting a number of basic service sets (BSSs) from a plurality of BSSs, wherein the selected number of BSSs is a subset of the plurality of BSSs; allocating one or more random resource units (RUs) to each of the selected BSSs; and transmitting a frame indicating the allocation of the one or more random RUs to each of the selected BSSs.

Another innovative aspect of the subject matter described in this disclosure can be implemented in an apparatus. The apparatus can include means for selecting a number of basic service sets (BSSs) from a plurality of BSSs, wherein the selected number of BSSs is a subset of the plurality of BSSs; means for allocating one or more random resource units (RUs) to each of the selected BSSs; and means for transmitting a frame indicating the allocation of the one or more random RUs to each of the selected BSSs.

Details of one or more implementations of the subject matter described in this disclosure are set forth in the accompanying drawings and the description below. Other features, aspects, and advantages will become apparent from the description, the drawings and the claims. Note that the relative dimensions of the following figures may not be drawn to scale.

BRIEF DESCRIPTION OF THE DRAWINGS

FIG. 5C shows a sequence diagram depicting an example allocation of random RUs to a selected basic service set (BSS).

FIG. 7A shows an example common information field.

FIG. 7B shows an example Per User Info field.

Like reference numerals refer to corresponding parts throughout the drawing figures.

DETAILED DESCRIPTION

Figure 1A:
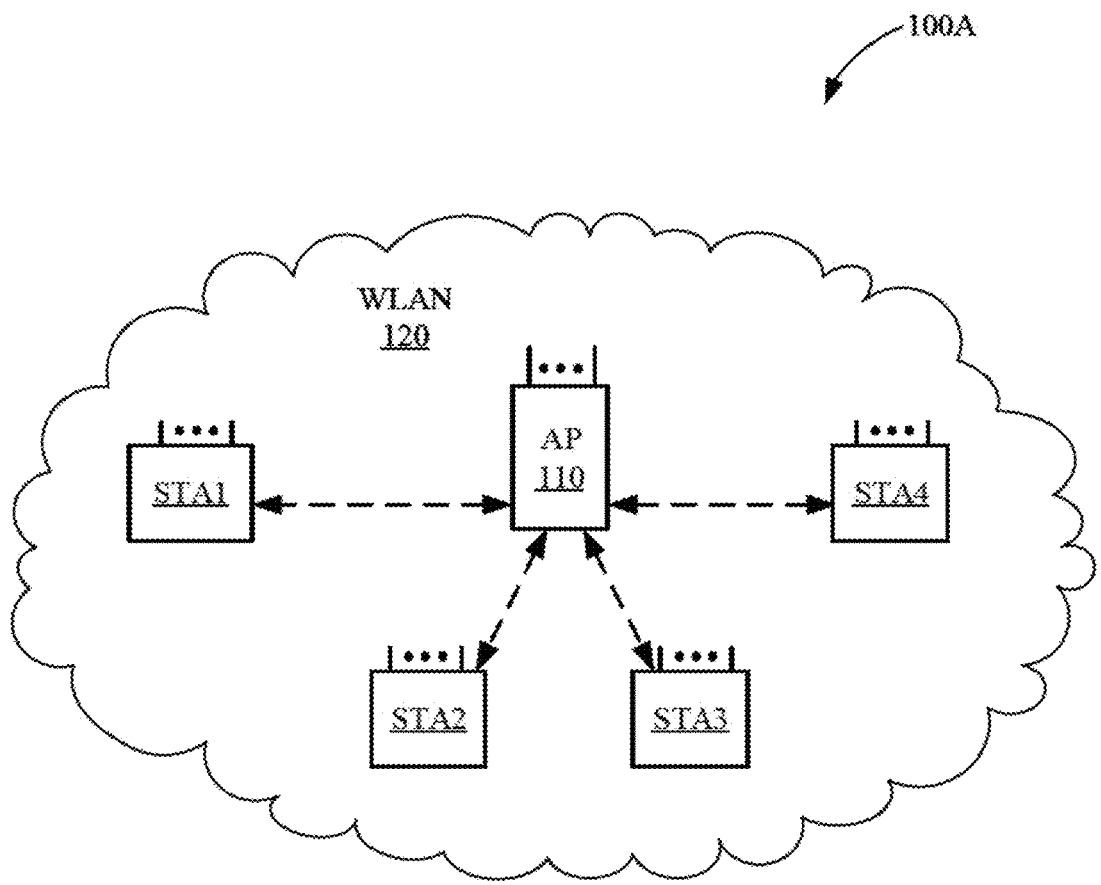
FIG. 1A shows a block diagram of a wireless system within which aspects of the present disclosure may be implemented.

The following description is directed to certain implementations for the purposes of describing the innovative aspects of this disclosure. However, a person having ordinary skill in the art will readily recognize that the teachings herein can be applied in a multitude of different ways. The described implementations may be implemented in any device, system or network that is capable of transmitting and receiving RF signals according to any of the IEEE 16.11 standards, or any of the IEEE 802.11 standards, the Bluetooth® standard, code division multiple access (CDMA), frequency division multiple access (FDMA), time division multiple access (TDMA), Global System for Mobile communications (GSM), GSM/General Packet Radio Service (GPRS), Enhanced Data GSM Environment (EDGE), Terrestrial Trunked Radio (TETRA), Wideband-CDMA (W-CDMA), Evolution Data Optimized (EV-DO), 1xEV-DO, EV-DO Rev A, EV-DO Rev B, High Speed Packet Access (HSPA), High Speed Downlink Packet Access (HSDPA), High Speed Uplink Packet Access (HSUPA), Evolved High Speed Packet Access (HSPA+), Long Term Evolution (LTE), AMPS, or other known signals that are used to communicate within a wireless, cellular or internet of things (TOT) network, such as a system utilizing 3G, 4G or 5G, or further implementations thereof, technology.

Implementations of the subject matter described in this disclosure may be used to prioritize the allocation of resource units (RUs) between multiple basic service sets (BSSs) for uplink (UL) data transmissions. In some implementations, an access point (AP) may prioritize the allocation of random RUs to BSSs based on at least one of the security parameters of the plurality of BSSs, access privileges of wireless devices belonging to the plurality of BSSs, types of wireless devices belonging to the plurality of BSSs, quality of service (QoS) parameters of the plurality of BSSs, and delay requirements of wireless devices belonging to the plurality of BSSs. In other implementations, the AP may prioritize the allocation of random RUs to a selected BSS (or to a selected number of BSSs) based on a bandwidth of a number of wireless devices belonging to the selected BSS (s).

Particular implementations of the subject matter described in this disclosure can be implemented to realize one or more of the following potential advantages. The ability to allocate random RUs to a selected BSS (such as rather than allocating random RUs to wireless devices within any or all BSSs controlled or operated by the AP) may increase utilization and efficiency of the wireless medium. For one example, if a first BSS includes 100 wireless devices and a second BSS includes 3 wireless devices, then the AP may allocate more random RUs to the first BSS, for example, because more wireless devices belong to the first BSS than to the second BSS. In this manner, the AP may ensure that the 3 wireless devices belonging to the second BSS do not receive a disproportionate share of the random RUs (such as compared with conventional resource allocation techniques that may allocate equal amounts of random RUs to the first and second BSSs). For another example, if a first BSS includes 4 smartphones that frequently facilitate VoIP calls and a second BSS includes 10 smart sensors, then the AP may allocate more random RUs to the first BSS, for example, because the 4 smartphones belonging to the first BSS have higher traffic classes and smaller latency tolerances than the 10 smart sensors belonging to the second BSS.

As used herein, the term "associated STA" refers to a STA that is associated with a given AP, and the term "non-associated STA" refers to a STA that is not associated with the given AP. In addition, as used herein, the term "directed trigger frame" may refer to a trigger frame that directs each of a number of STAs identified in the trigger frame to transmit uplink (UL) multi-user (MU) data on a resource unit allocated to the STA, and the term "random trigger frame" may refer to a trigger frame that allows any receiving STA to transmit UL MU data on one or more shared resource units indicated in the trigger frame.

FIG. 1A is a block diagram of a wireless system 100A within which aspects of the present disclosure may be implemented. The wireless system 100A is shown to include four wireless stations STA1-STA4, a wireless access point (AP) 110, and a wireless local area network (WLAN) 120. The WLAN 120 may be formed by a plurality of Wi-Fi access points (APs) that may operate according to the IEEE 802.11 family of standards (or according to other suitable wireless protocols). Thus, although only one AP 110 is shown in FIG. 1A for simplicity, it is to be understood that WLAN 120 may be formed by any number of access points such as AP 110. The AP 110 is assigned a unique media access control (MAC) address that is programmed therein by, for example, the manufacturer of the access point. Similarly, each of stations STA1-STA4 is also assigned a unique MAC address. In some aspects, the AP 110 may assign an association identification (AID) value to each of the stations STA1-STA4, for example, so that the AP 110 may identify the stations STA1-STA4 using their assigned AID values.

In some implementations, the WLAN 120 may allow for multiple-input multiple-output (MIMO) communications between the AP 110 and the stations STA1-STA4. The MIMO communications may include single-user MIMO (SU-MIMO) and multi-user MIMO (MU-MIMO) communications. In some aspects, the WLAN 120 may utilize a multiple channel access mechanism such as, for example, an orthogonal frequency-division multiple access (OFDMA) mechanism. Although the WLAN 120 is depicted in FIG. 1A as an infrastructure basic service set (BSS), in other implementations, the WLAN 120 may be an independent basic service set (IBSS), an ad-hoc network, or a peer-to-peer (P2P) network (such as operating according to the Wi-Fi Direct protocols).

Each of the stations STA1-STA4 may be any suitable wireless device including, for example, a cell phone, personal digital assistant (PDA), tablet device, laptop computer, or the like. Each of the stations STA1-STA4 may also be referred to as a user equipment (UE), a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. In some implementations, each of the stations STA1-STA4 may include one or more transceivers, one or more processing resources, one or more memory resources, and a power source (such as a battery). The memory resources may include a non-transitory computer-readable medium (such as one or more nonvolatile memory elements, such as EPROM, EEPROM, Flash memory, a hard drive, etc.) that stores instructions for performing operations described below with respect to FIG. 8.

The AP 110 may be any suitable device that allows one or more wireless devices to connect to a network (such as a local area network (LAN), wide area network (WAN), metropolitan area network (MAN), or the Internet) via the AP 110 using wireless communications such as, for example, Wi-Fi, Bluetooth, and cellular communications. In some implementations, the AP 110 may include one or more transceivers, one or more processing resources, one or more memory resources, and a power source. The memory resources may include a non-transitory computer-readable medium (such as one or more nonvolatile memory elements, such as EPROM, EEPROM, Flash memory, a hard drive, etc.) that stores instructions for performing operations described below with respect to FIG. 8.

For the stations STA1-STA4 and the AP 110, the one or more transceivers may include Wi-Fi transceivers, Bluetooth transceivers, cellular transceivers, and any other suitable radio frequency (RF) transceivers (not shown for simplicity) to transmit and receive wireless communication signals. Each transceiver may communicate with other wireless devices in distinct operating frequency bands, using distinct communication protocols, or both. For example, the Wi-Fi transceiver may communicate within a 900 MHz frequency band, a 2.4 GHz frequency band, a 5 GHz frequency band, and a 60 MHz frequency band in accordance with the IEEE 802.11 standards. The Bluetooth transceiver may communicate within the 2.4 GHz frequency band in accordance with the standards provided by the Bluetooth Special Interest Group (SIG), in accordance with the IEEE 802.15 standards, or both. The cellular transceiver may communicate within various RF frequency bands in accordance with any suitable cellular communications standard.

Figure 1B:
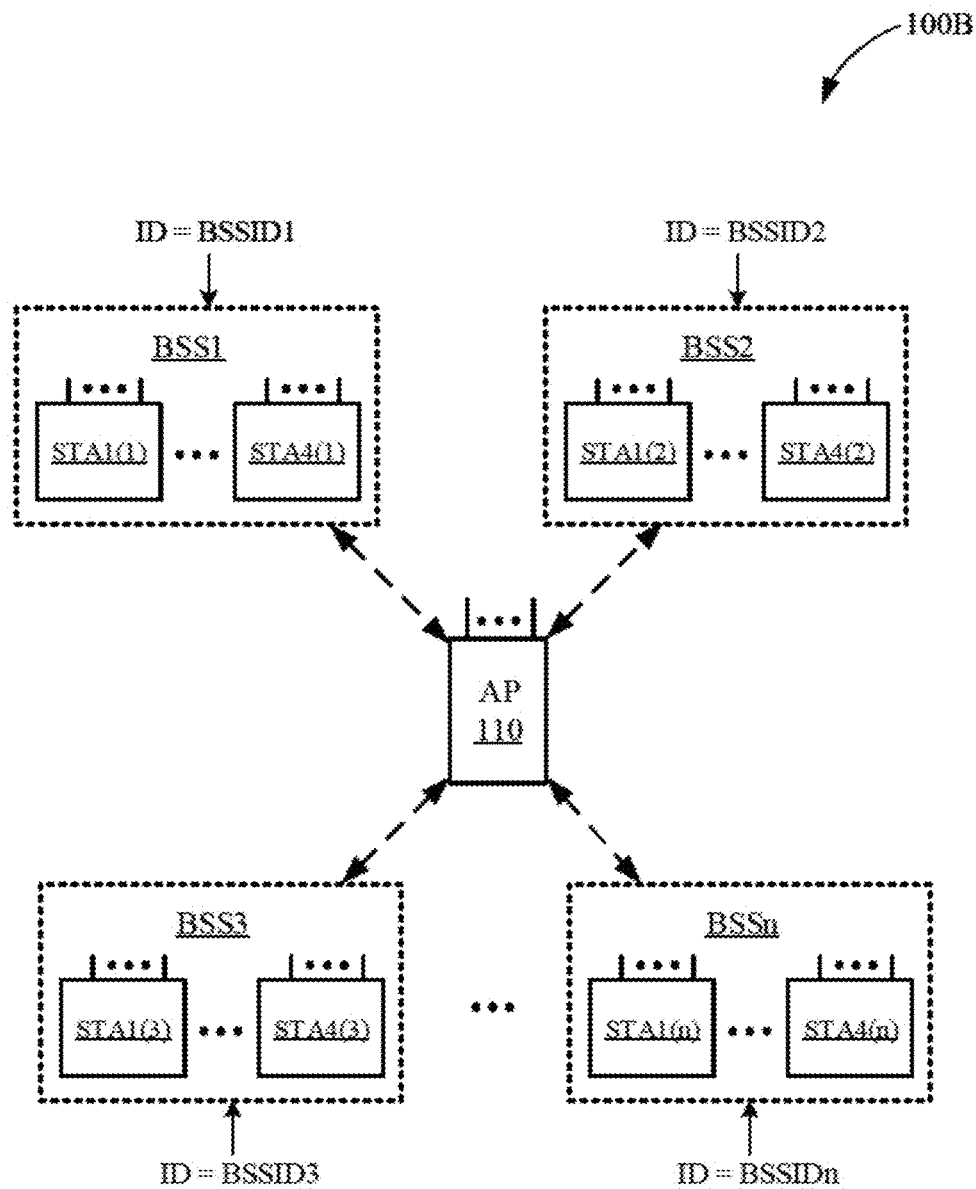
FIG. 1B shows a block diagram of another wireless system within which aspects of the present disclosure may be implemented.

FIG. 1B is a block diagram of another wireless system 100B within which aspects of the present disclosure may be implemented. The wireless system 100B is similar to the wireless system 100A of FIG. 1A, except that the AP 110 of FIG. 1B is depicted as independently operating a plurality of basic service sets BSS1-BSSn. More specifically, for the example of FIG. 1B, the first basic service set BSS1 includes a first set of wireless stations STA1(1)-STA4(1), the second basic service set BSS2 includes a second set of wireless stations STA1(2)-STA4(2), the third basic service set BSS3 includes a third set of wireless stations STA1(3)-STA4(3), and so on, where the $n^{th}$ basic service set BSSn includes an $n^{th}$ set of wireless stations STA1(n)-STA4(n). Each of the basic service sets BSS1-BSSn may be assigned a different basic service set identification (BSSID), for example, so that the AP 110 and each of the sets of wireless stations STA1-STA4 may distinguish between data transmissions associated with each of the different basic service sets BSS1-BSSn. In some implementations, each of the BSSIDs assigned to the basic service sets BSS1-BSSn may be a unique identifier (such as a unique 48-bit identifier). In some aspects, the BSSIDs may be used as a filtering address, for example, so that only the wireless stations STAs associated with a given BSS may receive and decode frames or packets intended for reception by wireless devices belonging to or associated with the given BSS.

As used herein, the first basic service set BSS1 may be assigned a first ID denoted herein as "BSSID1," the second basic service set BSS2 may be assigned a second ID denoted herein as "BSSID2," the third basic service set BSS3 may be assigned a third ID denoted herein as "BSSID3," and so on, where the $n^{th}$ basic service set BSSn may be assigned an $n^{th}$ ID denoted herein as "BSSIDn."

Figure 2:
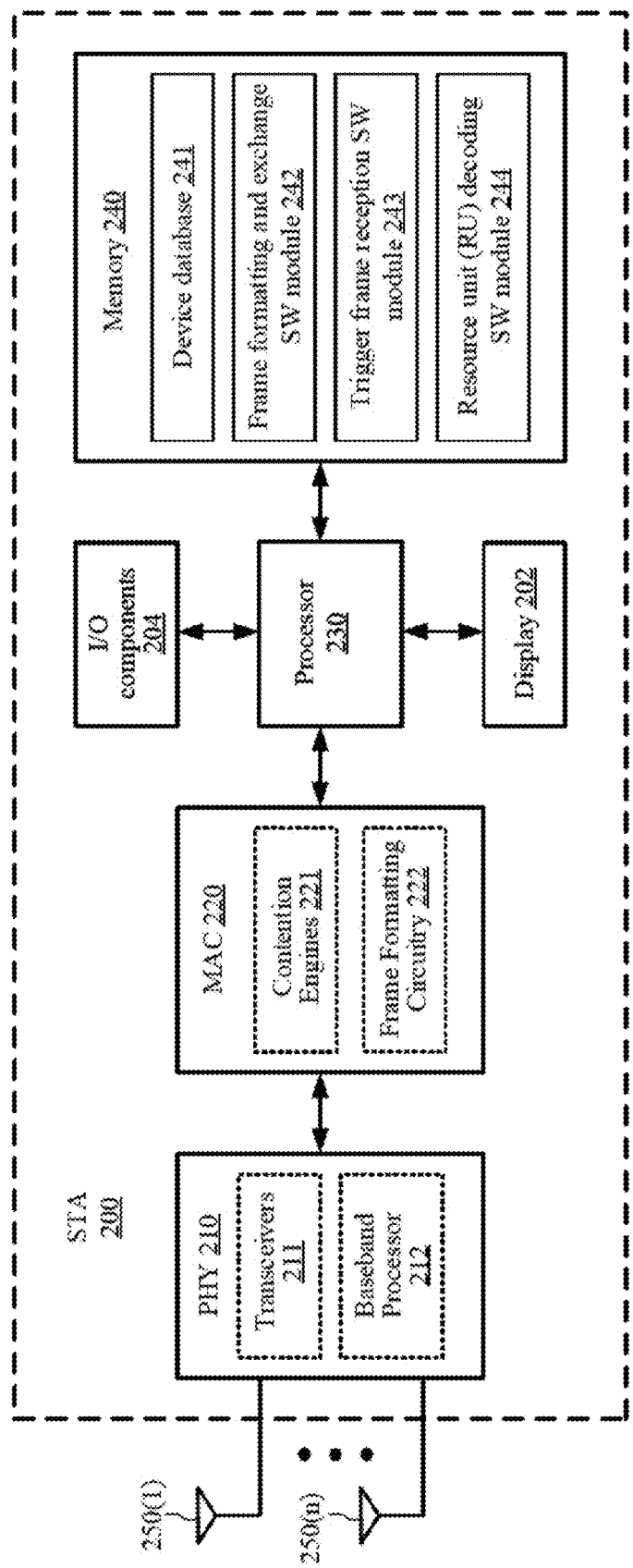
FIG. 2 shows a block diagram of an example wireless station.

FIG. 2 shows an example STA 200. In some implementations, the STA 200 may be one example of one or more of the wireless stations STA1-STA4 of FIG. 1A. In other implementations, the STA 200 may be one example of one or more of the wireless stations STA1-STA4 within each of the BSSs of FIG. 1B. The STA 200 may include a display 202, input/output (I/O) components 204, a physical-layer device (PHY) 210, a MAC 220, a processor 230, a memory 240, and a number of antennas 250(1)-250(n).

The display 202 may be any suitable display or screen upon which items may be presented to a user (such as for viewing, reading, or watching). In some aspects, the display 202 may be a touch-sensitive display that allows for user interaction with the STA 200 and that allows the user to control one or more operations of the STA 2000. The I/O components 204 may be or include any suitable mechanism, interface, or device to receive input (such as commands) from the user and to provide output to the user. For example, the I/O components 204 may include (but are not limited to) a graphical user interface, keyboard, mouse, microphone, speakers, and so on.

The PHY 210 may include at least a number of transceivers 211 and a baseband processor 212. The transceivers 211 may be coupled to the antennas 250(1)-250(n), either directly or through an antenna selection circuit (not shown for simplicity). The transceivers 211 may be used to transmit signals to and receive signals from the AP 110 and other STAs (see also FIGS. 1A and 1B), and may be used to scan the surrounding environment to detect and identify nearby access points and other STAs (such as within wireless range of the STA 200). Although not shown in FIG. 2 for simplicity, the transceivers 211 may include any number of transmit chains to process and transmit signals to other wireless devices via the antennas 250(1)-250(n), and may include any number of receive chains to process signals received from the antennas 250(1)-250(n). In some implementations, the STA 200 may be configured for MIMO operations. The MIMO operations may include SU-MIMO operations and MU-MIMO operations. The STA 200 also may be configured for OFDMA communications and other suitable multiple access mechanisms, for example, as may be provided for in the IEEE 802.11ax standards.

The baseband processor 212 may be used to process signals received from the processor 230 or the memory 240 (or both) and to forward the processed signals to the transceivers 211 for transmission via one or more of the antennas 250(1)-250(n), and may be used to process signals received from one or more of the antennas 250(1)-250(n) via the transceivers 211 and to forward the processed signals to the processor 230 or the memory 240 (or both).

The MAC 220 may include at least a number of contention engines 221 and frame formatting circuitry 222. The contention engines 221 may contend for access to one more shared wireless mediums, and may also store packets for transmission over the one more shared wireless mediums.

The STA 200 may include one or more contention engines 221 for each of a plurality of different access categories. In other implementations, the contention engines 221 may be separate from the MAC 220. For still other implementations, the contention engines 221 may be implemented as one or more software modules (such as stored in memory 240 or stored in memory provided within the MAC 220) containing instructions that, when executed by the processor 230, perform the functions of the contention engines 221.

The frame formatting circuitry 222 may be used to create and format frames received from the processor 230 (such as by adding MAC headers to PDUs provided by the processor 230), and may be used to re-format frames received from the PHY 210 (such as by stripping MAC headers from frames received from the PHY 210). Although the example of FIG. 2 depicts the MAC 220 coupled to the memory 240 via the processor 230, in other implementations, the PHY 210, the MAC 220, the processor 230, and the memory 240 may be connected using one or more buses (not shown for simplicity).

The processor 230 may be any suitable one or more processors capable of executing scripts or instructions of one or more software programs stored in the STA 200 (such as within the memory 240). In some implementations, the processor 230 may be or include one or more microprocessors providing the processor functionality and external memory providing at least a portion of machine-readable media. In other implementations, the processor 230 may be or include an Application Specific Integrated Circuit (ASIC) with the processor, the bus interface, the user interface, and at least a portion of the machine-readable media integrated into a single chip. In some other implementations, the processor 230 may be or include one or more Field Programmable Gate Arrays (FPGAs) or Programmable Logic Devices (PLDs).

The memory 240 may include a device database 241 that stores profile information for the STA 200 and for a number of other wireless devices such as APs and other STAs. The profile information for the STA 200 may include, for example, its MAC address, the BSSID of the basic service set to which the STA 200 belongs, bandwidth capabilities, supported channel access mechanisms, supported data rates, and so on. The profile information for a particular AP may include, for example, the AP's basic service set identification (BSSID), MAC address, channel information, received signal strength indicator (RSSI) values, goodput values, channel state information (CSI), supported data rates, connection history with the AP, a trustworthiness value of the AP (such as indicating a level of confidence about the AP's location, etc.), and any other suitable information pertaining to or describing the operation of the AP.

The memory 240 may also include a non-transitory computer-readable medium (such as one or more nonvolatile memory elements, such as EPROM, EEPROM, Flash memory, a hard drive, and so on) that may store at least the following software (SW) modules:

a frame formatting and exchange software module 242 to facilitate the creation and exchange of any suitable frames (such as data frames, action frames, control frames, and management frames) between the STA 200 and other wireless devices, for example, as described below for one or more operations of FIG. 8;

a trigger frame reception software module 243 to receive trigger frames, to determine whether the trigger frames solicit a response from the STA 200, and to determine whether the trigger frames allocate any RUs to the STA 200, for example, as described below for one or more operations of FIG. 8; and a resource unit (RU) decoding software module 244 to determine which (if any) RUs are allocated to the STA 200, to determine which (if any) RUs are allocated to a BSS with which the STA 200 is associated, to determine whether any random RUs are available to the STA 200, and to determine the size, location, and other parameters of any allocated RUs, for example, as described below for one or more operations of FIG. 8.

Each software module includes instructions that, when executed by the processor 230, cause the STA 200 to perform the corresponding functions. The non-transitory computer-readable medium of the memory 240 thus includes instructions for performing all or a portion of the operations described below with respect to FIG. 8.

The processor 230 may execute the frame formatting and exchange software module 242 to facilitate the creation and exchange of any suitable frames (such as data frames, action frames, control frames, and management frames) between the STA 200 and other wireless devices. The processor 230 may execute the trigger frame reception software module 243 to receive trigger frames, to determine whether the trigger frames solicit a response from the STA 200, and to determine whether the trigger frames allocate any RUs to the STA 200. The processor 230 may execute the decoding software module 244 to determine which (if any) RUs are allocated to the STA 200, to determine which (if any) RUs are allocated to a BSS with which the STA 200 is associated or to which the STA 200 belongs, to determine whether any random RUs are available to the STA 200, and to determine the size, location, and other parameters of any allocated RUs.

Figure 3:
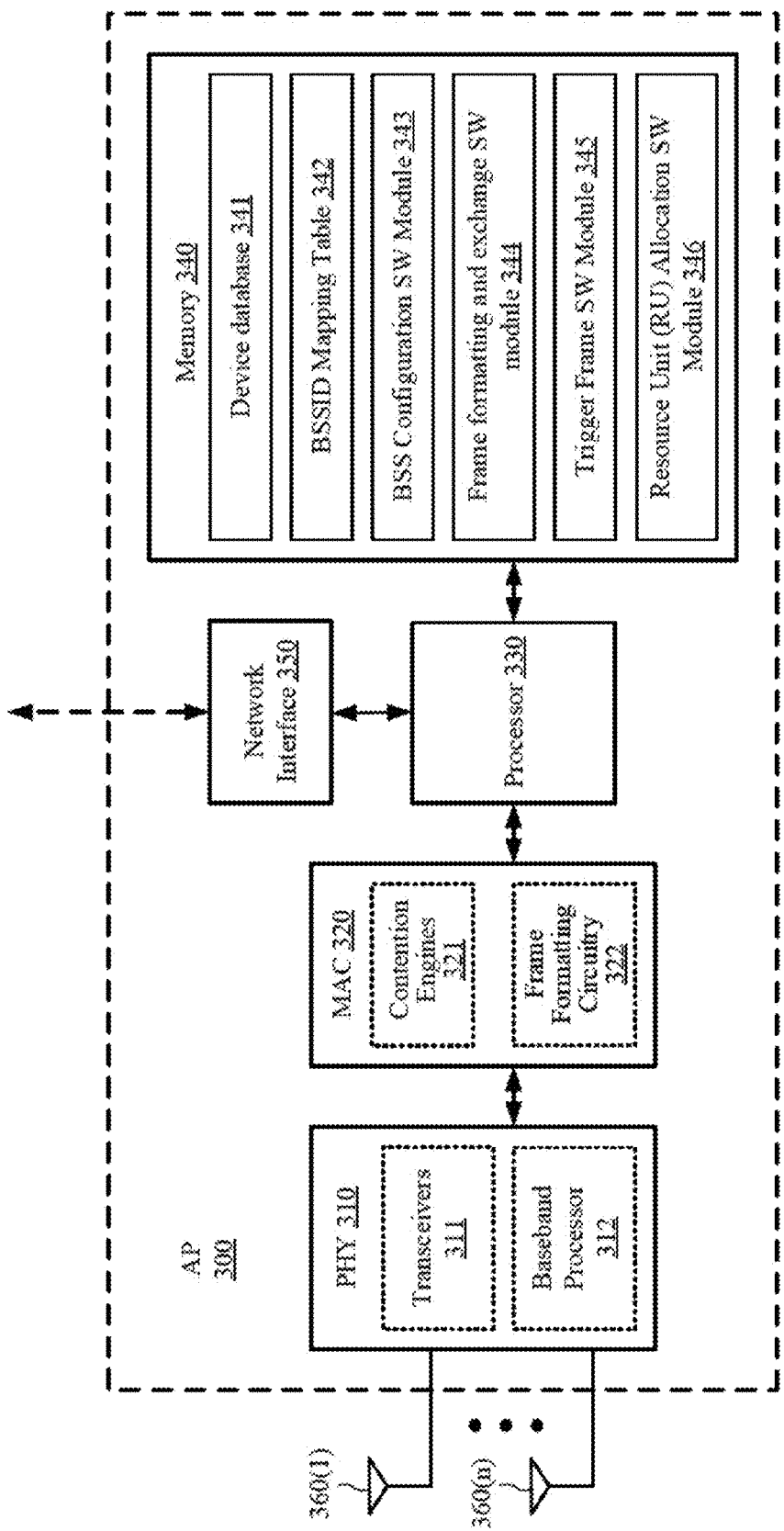
FIG. 3 shows a block diagram of an example access point.

FIG. 3 shows an example AP 300. The AP 300 may be one implementation of the AP 110 of FIGS. 1A and 1B. The AP 300 may include a PHY 310, a MAC 320, a processor 330, a memory 340, a network interface 350, and a number of antennas 360(1)-360(n). The PHY 310 may include at least a number of transceivers 311 and a baseband processor 312. The transceivers 311 may be coupled to the antennas 360(1)-360(n), either directly or through an antenna selection circuit (not shown for simplicity). The transceivers 311 may be used to communicate wirelessly with one or more STAs, with one or more other APs, and with other suitable devices. Although not shown in FIG. 3 for simplicity, the transceivers 311 may include any number of transmit chains to process and transmit signals to other wireless devices via the antennas 360(1)-360(n), and may include any number of receive chains to process signals received from the antennas 360(1)-360(n). In some implementations, the AP 300 may be configured for MIMO operations such as SU-MIMO operations and MU-MIMO operations. The AP 300 also may be configured for OFDMA communications and other suitable multiple access mechanisms, for example, as may be provided for in the IEEE 802.11ax standards.

The baseband processor 312 may be used to process signals received from the processor 330 or the memory 340 (or both) and to forward the processed signals to the transceivers 311 for transmission via one or more of the antennas 360(1)-360(n), and may be used to process signals received from one or more of the antennas 360(1)-360(n) via the transceivers 311 and to forward the processed signals to the processor 330 or the memory 340 (or both).

The network interface 350 may be used to communicate with a WLAN server (not shown for simplicity) either directly or via one or more intervening networks and to transmit signals.

The MAC 320 may include at least a number of contention engines 321 and frame formatting circuitry 322. The contention engines 321 may contend for access to the shared wireless medium, and may also store packets for transmission over the shared wireless medium. In some implementations, the AP 300 may include one or more contention engines 321 for each of a plurality of different access categories. In other implementations, the contention engines 321 may be separate from the MAC 320. For still other implementations, the contention engines 321 may be implemented as one or more software modules (such as stored in the memory 340 or within memory provided within the MAC 320) containing instructions that, when executed by the processor 330, perform the functions of the contention engines 321.

The frame formatting circuitry 322 may be used to create and format frames received from the processor 330 (such as by adding MAC headers to PDUs provided by the processor 330), and may be used to re-format frames received from the PHY 310 (such as by stripping MAC headers from frames received from the PHY 310). Although the example of FIG. 3 depicts the MAC 320 coupled to the memory 340 via the processor 330, in other implementations, the PHY 310, the MAC 320, the processor 330, and the memory 340 may be connected using one or more buses (not shown for simplicity).

The processor 330 may be any suitable one or more processors capable of executing scripts or instructions of one or more software programs stored in the STA 300 (such as within the memory 340). In some implementations, the processor 330 may be or include one or more microprocessors providing the processor functionality and external memory providing at least a portion of machine-readable media. In other implementations, the processor 330 may be or include an Application Specific Integrated Circuit (ASIC) with the processor, the bus interface, the user interface, and at least a portion of the machine-readable media integrated into a single chip. In some other implementations, the processor 330 may be or include one or more Field Programmable Gate Arrays (FPGAs) or Programmable Logic Devices (PLDs).

The memory 340 may include a device database that stores profile information for a plurality of STAs. The profile information for a particular STA may include, for example, its MAC address, supported data rates, connection history with the AP 300, one or more RUs allocated to the STA, the BSS with which the STA is associated or to which the STA belongs, and any other suitable information pertaining to or describing the operation of the STA.

The memory 340 may also include a BSSID mapping table 342 that may store mapping information between AID values and BSSID values, information indicating which wireless devices are part of or belong to each of a number of different BSSs, one or more characteristics or parameters of each of the different BSSs, and any other suitable information pertaining to or describing the operation of one or more BSSs that may be created by, operated by, or otherwise associated with the AP 300.

The memory 340 may also include a non-transitory computer-readable medium (such as one or more nonvolatile memory elements, such as EPROM, EEPROM, Flash memory, a hard drive, and so on) that may store at least the following software (SW) modules:

a BSS configuration software module 343 to set-up, configure, and operate multiple BSSs and to assign a number of wireless devices to each of the BSSs operated by the AP 300, for example, as described below for one or more operations of FIG. 8;

a frame formatting and exchange software module 344 to facilitate the creation and exchange of any suitable frames (such as data frames, action frames, control frames, and management frames) between the AP 300 and other wireless devices, for example, as described below for one or more operations of FIG. 8;

a trigger frame software module 345 to facilitate the transmission of trigger frames to one or more wireless devices, for example, as described below for one or more operations of FIG. 8; and a resource unit (RU) allocation software module 346 to allocate a number of dedicated RUs to a number of wireless devices identified by a trigger frame, to allocate a number of random RUs to a number of wireless devices that receive a trigger frame, and to allocate one or more random RUs to each of a number of selected BSSs, for example, as described below for one or more operations of FIG. 8.

Each software module includes instructions that, when executed by the processor 330, cause the AP 300 to perform the corresponding functions. The non-transitory computer-readable medium of the memory 340 thus includes instructions for performing all or a portion of the operations described below with respect to FIG. 8.

The processor 330 may execute the BSS configuration software module 343 to set-up, configure, and operate multiple BSSs and to assign a number of wireless devices to each of the BSSs operated by the AP 300. The processor 330 may execute the frame formatting and exchange software module 344 to facilitate the creation and exchange of any suitable frames (such as data frames, action frames, control frames, and management frames) between the AP 300 and other wireless devices. The processor 330 may execute the trigger frame software module 345 to facilitate the transmission of trigger frames to one or more wireless devices. The processor 330 may execute the RU allocation software module 345 to allocate a number of dedicated RUs to a number of wireless devices identified by a trigger frame, to allocate a number of random RUs to a number of wireless devices that receive a trigger frame, and to allocate one or more random RUs to each of the selected BSSs.

The IEEE 802.11ax specification may introduce multiple access mechanisms, such as an orthogonal frequency-division multiple access (OFDMA) mechanism, to allow multiple STAs to transmit and receive data on a shared wireless medium at the same time. For a wireless network using OFDMA, the available frequency spectrum may be divided into a plurality of resource units (RUs) each including a number of different frequency subcarriers, and different RUs may be allocated or assigned (such as by an AP) to different wireless devices (such as STAs) at a given point in time. In this manner, multiple wireless devices may concurrently transmit data on the wireless medium using their assigned RUs or frequency subcarriers.

Figure 4A:
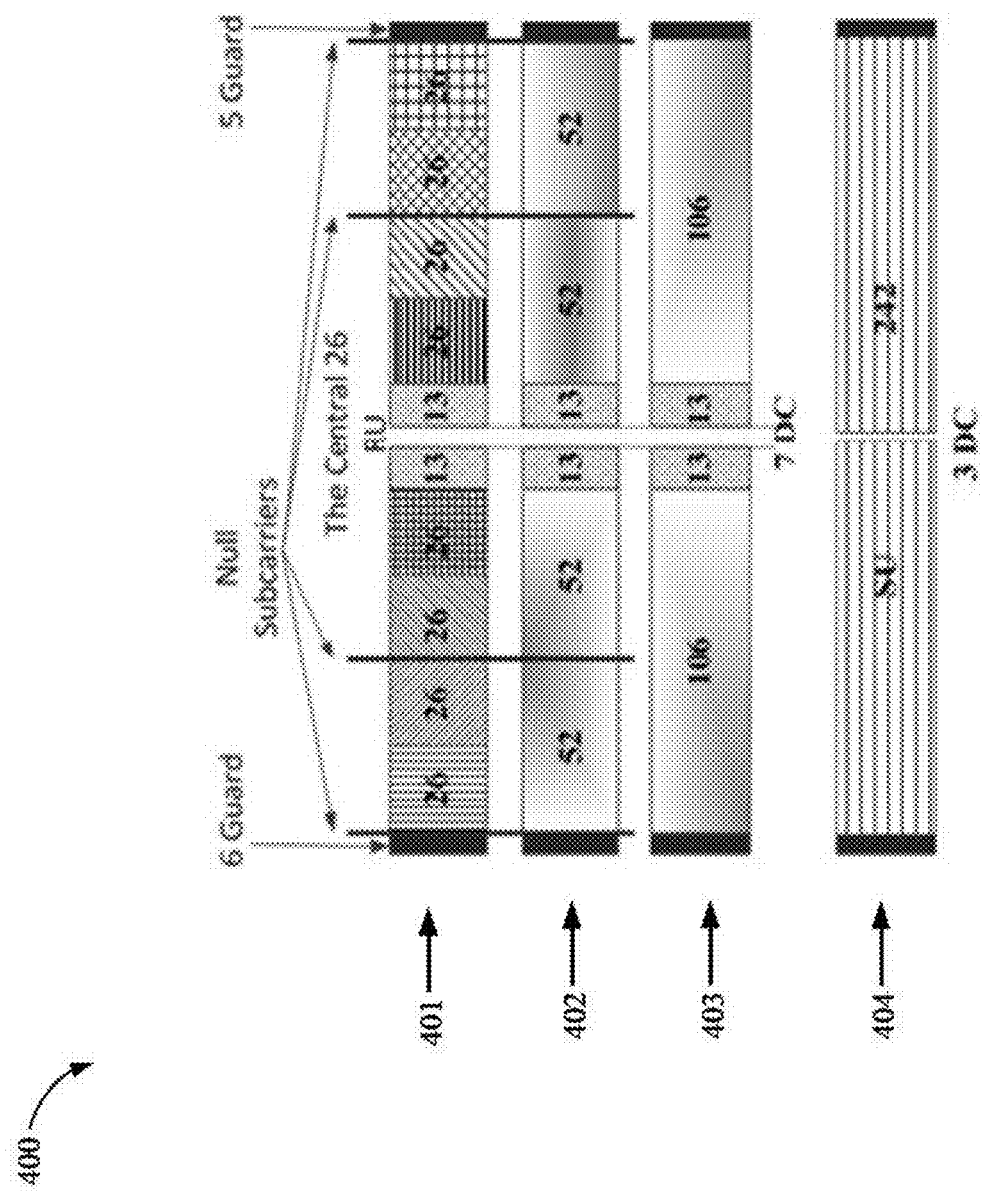
FIG. 4A shows an example subcarrier allocation diagram for a 20 MHz bandwidth.

FIG. 4A shows an example subcarrier allocation diagram 400 for a 20 MHz bandwidth according to the IEEE 802.11ax standards. As shown in FIG. 4A, a 20 MHz bandwidth may be divided into a number of resource units (RUs), and each RU may include a number of subcarriers. In some aspects, a first subcarrier allocation 401 may include a number of RUs each including 26 subcarriers, a second subcarrier allocation 402 may include a number of RUs each including 52 subcarriers, a third subcarrier allocation 403 may include a number of RUs each including 106 subcarriers, and a fourth subcarrier allocation 404 may include one RU including 242 subcarriers. For each of the example subcarrier allocations 401-404 depicted in FIG. 4A, adjacent RUs may be separated by a null subcarrier (such as a DC subcarrier), for example, to reduce leakage between adjacent RUs.

Figure 4B:
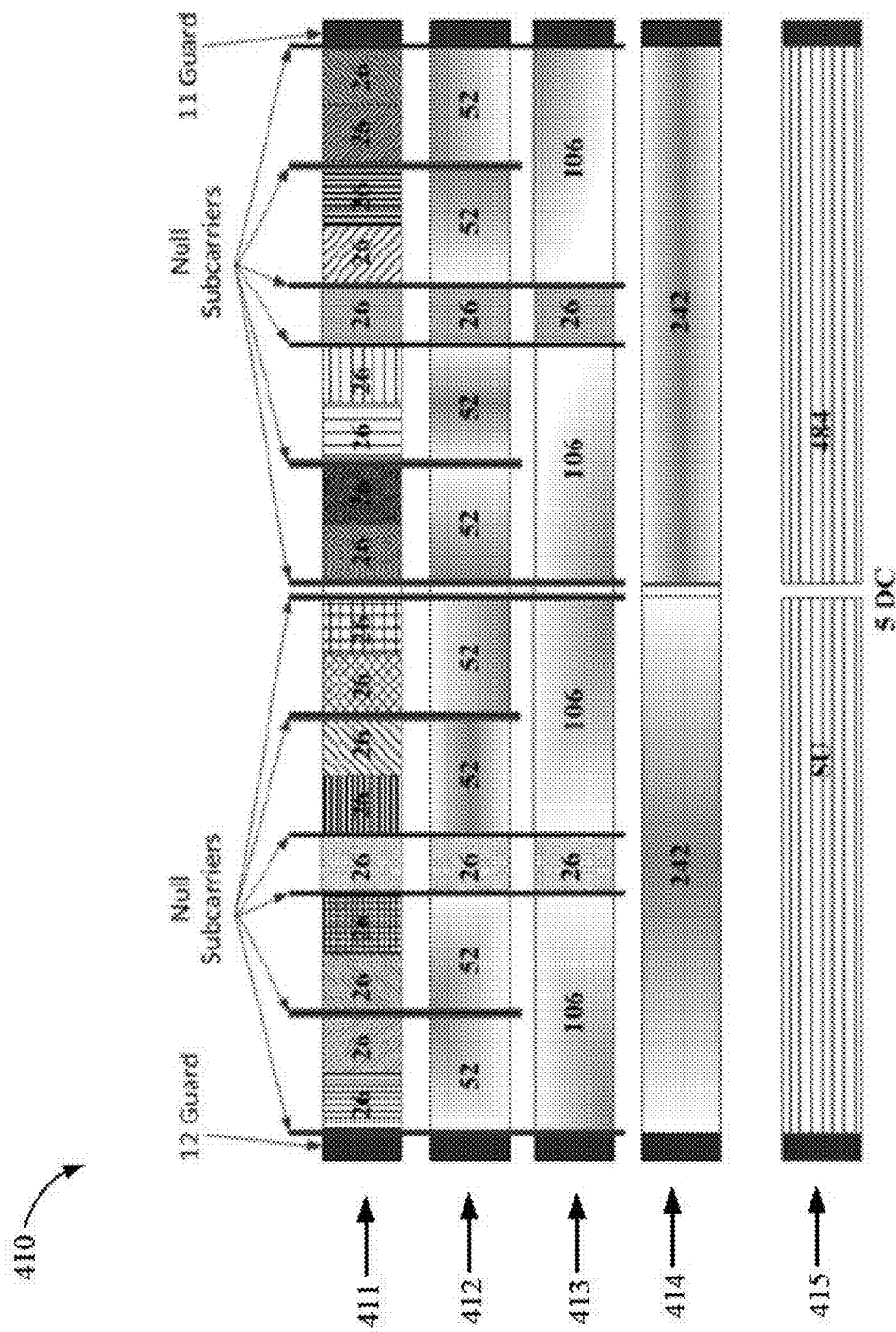
FIG. 4B shows an example subcarrier allocation diagram for a 40 MHz bandwidth.

FIG. 4B shows an example subcarrier allocation diagram 410 for a 40 MHz bandwidth according to the IEEE 802.11ax standards. As shown in FIG. 4B, a 40 MHz bandwidth may be divided into a number of RUs, and each RU may include a number of subcarriers. In some aspects, a first subcarrier allocation 411 may include a number of RUs each including 26 subcarriers, a second subcarrier allocation 412 may include a number of RUs each including 52 subcarriers, a third subcarrier allocation 413 may include a number of RUs each including 106 subcarriers, a fourth subcarrier allocation 414 may include a number of RUs each including 242 subcarriers, and a fifth subcarrier allocation 415 may include one RU including 484 subcarriers. For each of the example subcarrier allocations 411-415 depicted in FIG. 4B, adjacent RUs may be separated by a null subcarrier, for example, to reduce leakage between adjacent RUs.

Figure 4C:
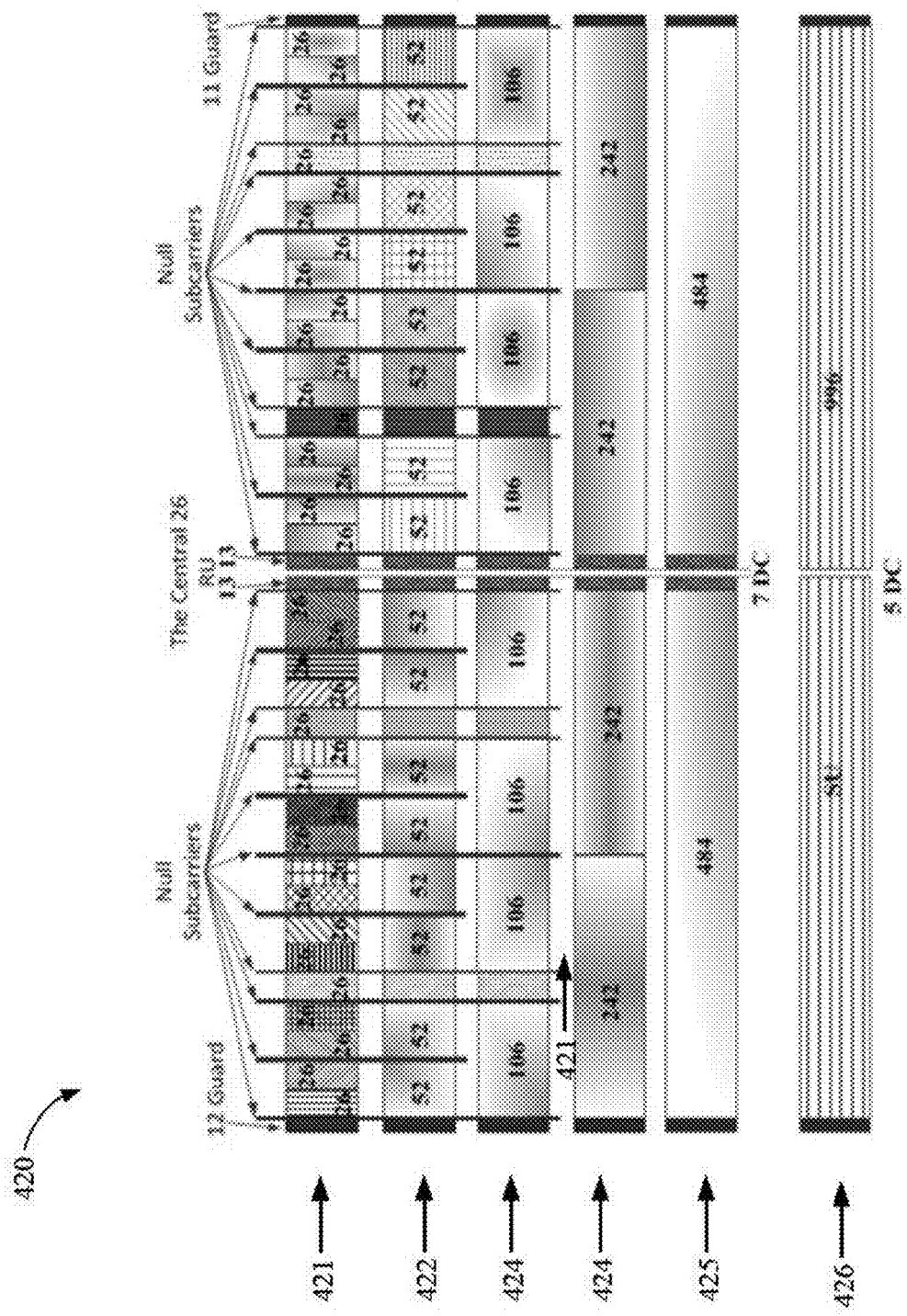
FIG. 4C shows an example subcarrier allocation diagram for an 80 MHz bandwidth.

FIG. 4C shows an example subcarrier allocation diagram 420 for an 80 MHz bandwidth according to the IEEE 802.11ax standards. As shown in FIG. 4C, an 80 MHz bandwidth may be divided into a number of resource units (RUs), and each RU may include a number of subcarriers. In some aspects, a first subcarrier allocation 421 may include a number of RUs each including 26 subcarriers, a second subcarrier allocation 422 may include a number of RUs each including 52 subcarriers, a third subcarrier allocation 423 may include a number of RUs each including 106 subcarriers, a fourth subcarrier allocation 424 may include a number of RUs each including 242 subcarriers, a fifth subcarrier allocation 425 may include a number of RUs each including 484 subcarriers, and a sixth subcarrier allocation 426 may include one RU including 996 subcarriers. For each of the example subcarrier allocations 421-426 depicted in FIG. 4C, adjacent RUs may be separated by a null subcarrier, for example, to reduce leakage between adjacent RUs.

An AP may allocate specific or dedicated RUs to a number of associated STAs using a trigger frame. In some implementations, the trigger frame may identify a number of STAs associated with the AP, and may solicit uplink (UL) multi-user (MU) data transmissions from the identified STAs using their allocated RUs. The trigger frame may use association identification (AID) values, assigned by the AP to its associated STAs, to identify which STAs are to transmit UL data to the AP in response to the trigger frame. In some aspects, the trigger frame may indicate the RU size and location, the modulation and coding scheme (MCS), and the power level for UL transmissions to be used by each of the STAs identified in the trigger frame. As used herein, the RU size may indicate the bandwidth of the RU, and the RU location may indicate which frequency subcarriers are allocated to the RU. A trigger frame that allocates dedicated RUs to a number of associated STAs identified in the trigger frame may be referred to herein as a "directed" trigger frame.

Figure 5A:
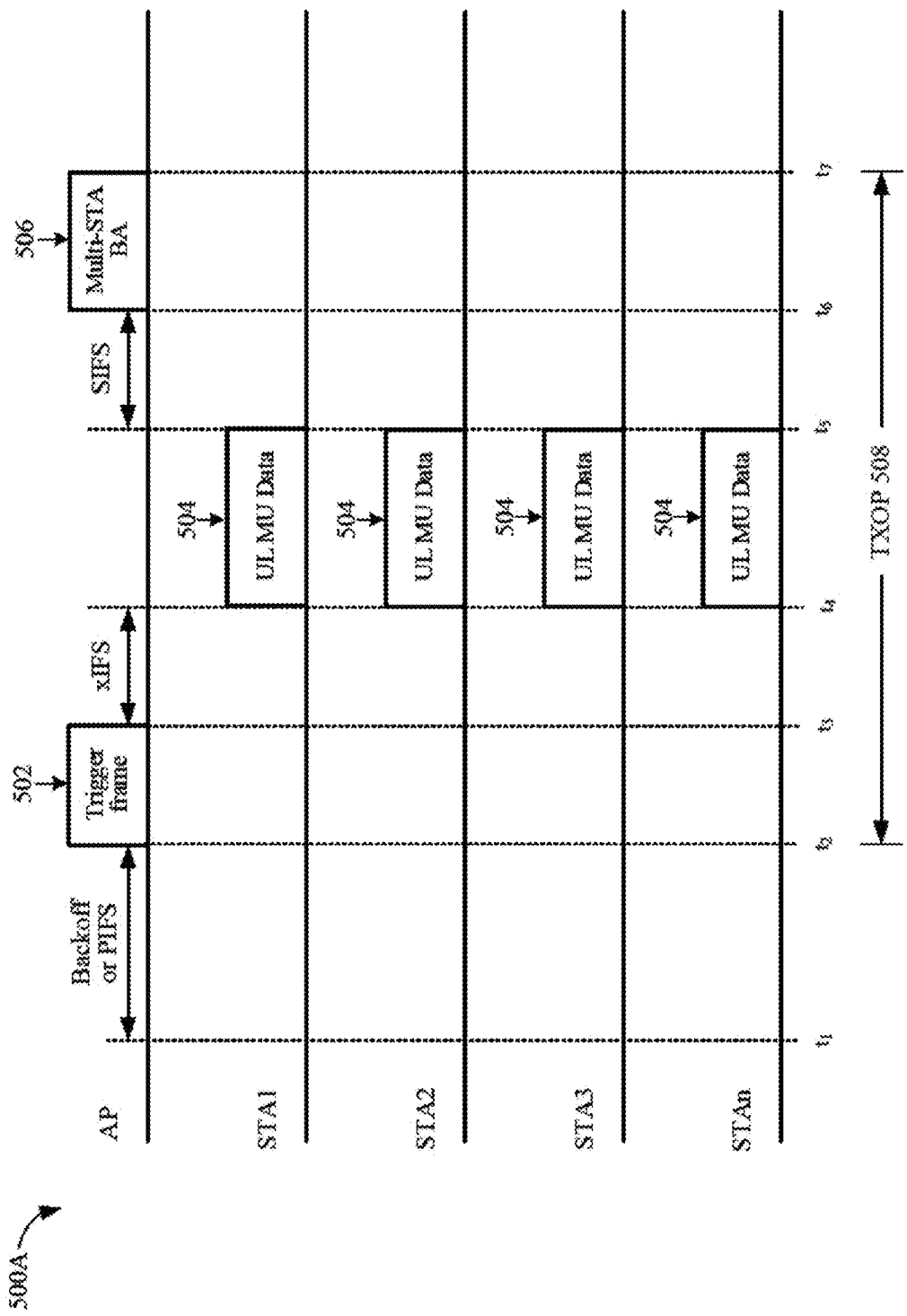
FIG. 5A shows a sequence diagram depicting an example allocation of dedicated resource units (RUs) to a number of wireless stations.

FIG. 5A shows a sequence diagram 500A depicting an example allocation of dedicated resource units (RUs) to a number of wireless stations. The AP of FIG. 5A may be any suitable AP including, for example, the AP 110 of FIG. 1A, the AP 110 of FIG. 1B, or the AP 300 of FIG. 3. Each of the wireless stations STA1-STAn may be any suitable wireless station including, for example, the stations STA1-STA4 of FIG. 1A, the sets of stations STA1-STA4 of FIG. 1B, or the STA 200 of FIG. 2.

In some implementations, the AP may contend for medium access during a backoff period or a point coordination function (PCF) interframe space (PIFS) duration (such as between times $t_1$ and $t_2$). In other implementations, the AP may contend for medium access using another suitable channel access mechanism. In some other implementations, the AP may utilize a multiple channel access mechanism, for example, and may not contend for medium access.

The AP gains access to the wireless medium at time $t_2$, and may transmit a directed trigger frame 502 to the stations STA1-STAn on a downlink (DL) channel. Time $t_2$ may indicate a beginning of a transmit opportunity (TXOP) 508. The directed trigger frame 502 may allocate a dedicated RU to each of a number of stations STA1-STA4 identified by the directed trigger frame 502 for uplink (UL) transmissions. In some aspects, the dedicated RUs allocated by the directed trigger frame 502 may be unique, for example, so that the stations STA1-STAn may transmit UL data to the AP at the same time (or at substantially the same time). The directed trigger frame 502 also may solicit UL MU data transmissions from the number of stations STA1-STAn identified by the directed trigger frame 502.

The stations STA1-STAn may receive the directed trigger frame 502 at (or around) time $t_3$. Each of the stations STA1-STAn may decode a portion of the directed trigger frame 502 to determine whether the station is identified by the directed trigger frame 502. In some aspects, the directed trigger frame 502 may use AID values assigned to the stations STA1-STAn to identify which of the stations STA1-STAn have been allocated dedicated RUs and to indicate which of the stations STA1-STAn are to transmit UL data based on reception of the directed trigger frame 502. Each of the stations STA1-STAn that is not identified by the directed trigger frame 502 may not transmit UL data during the TXOP 508, for example, because they may not have been allocated dedicated RUs for UL transmissions.

Each of the stations STA1-STAn that is identified by the directed trigger frame 502 may decode additional portions of the directed trigger frame 502 to determine the size and location of the dedicated RU allocated thereto. In some aspects, the directed trigger frame 502 may schedule UL data transmissions from the identified stations STA1-STAn to commence at an unspecified interframe spacing (xIFS) duration after reception of the directed trigger frame 502, for example, as depicted in the example of FIG. 5A.

At time $t_4$, the stations STA1-STAn identified by the directed trigger frame 502 may begin transmitting UL MU data 504 on their respective dedicated RUs. In some aspects, each of the stations STA1-STAn identified by the directed trigger frame 502 may determine whether the frequency band associated with its allocated RU has been idle for a duration (such as a PIFS duration) prior to transmitting UL MU data to the AP. For the example of FIG. 5A, all of the stations STA1-STAn are allocated a dedicated RU by the directed trigger frame 502, and all of the stations STA1-STAn transmit UL MU data to the AP using their respective dedicated RUs. In other implementations, a subset (such as less than all) of the stations STA1-STAn may be allocated dedicated RUs by the directed trigger frame 502.

The AP may receive the UL MU data 504 from the identified stations STA1-STAn at time $t_5$, and may acknowledge reception of the UL MU data 504 from the stations STA1-STAn by transmitting acknowledgement (ACK)

frames at time $t_6$. In some aspects, the AP may acknowledge reception of the UL MU data by transmitting an MU ACK frame to the stations STA1-STAn. In other aspects, the AP may acknowledge reception of the UL MU data by transmitting a multi-station block acknowledgement (M-BA) frame 506 to the stations STA1-STAn, for example, as depicted in FIG. 5A.

As depicted in the example of FIG. 5A, the AP may transmit the M-BA frame 506 a short interframe spacing (SIFS) duration after receiving the UL MU data transmitted from the stations STA1-STAn. In other implementations, the AP may transmit the M-BA frame 506 after another suitable duration.

In addition, or in the alternative, the AP may transmit a trigger frame that allocates random RUs to the stations STA1-STAn for UL data transmissions. In some implementations, the random RUs may be contention-based resources that are shared by all STAs that receive the trigger frame. The random RUs may be used by any STA that receives the trigger frame, including STAs that are not associated with the AP. Allocation of the random RUs may allow STAs that were not identified in the directed trigger frame 502 to transmit UL data to the AP (such as by using the random RUs rather than the dedicated RUs allocated by the directed trigger frame 502). The exclusion of a given STA from UL data transmissions on dedicated RUs allocated by the directed trigger frame 502 may be based on a variety of factors including, for example, a failure of the AP to receive a buffer status report (BSR) from the given STA, a limited number of dedicated RUs that may be allocated for UL MU data transmissions, or the absence of an AID assigned to the given STA (such as because the given STA is not associated with the AP). A trigger frame that allocates random RUs (such as for OFDMA-based random channel access) to all receiving STAs may be referred to herein as a "wildcard" trigger frame.

Figure 5B:
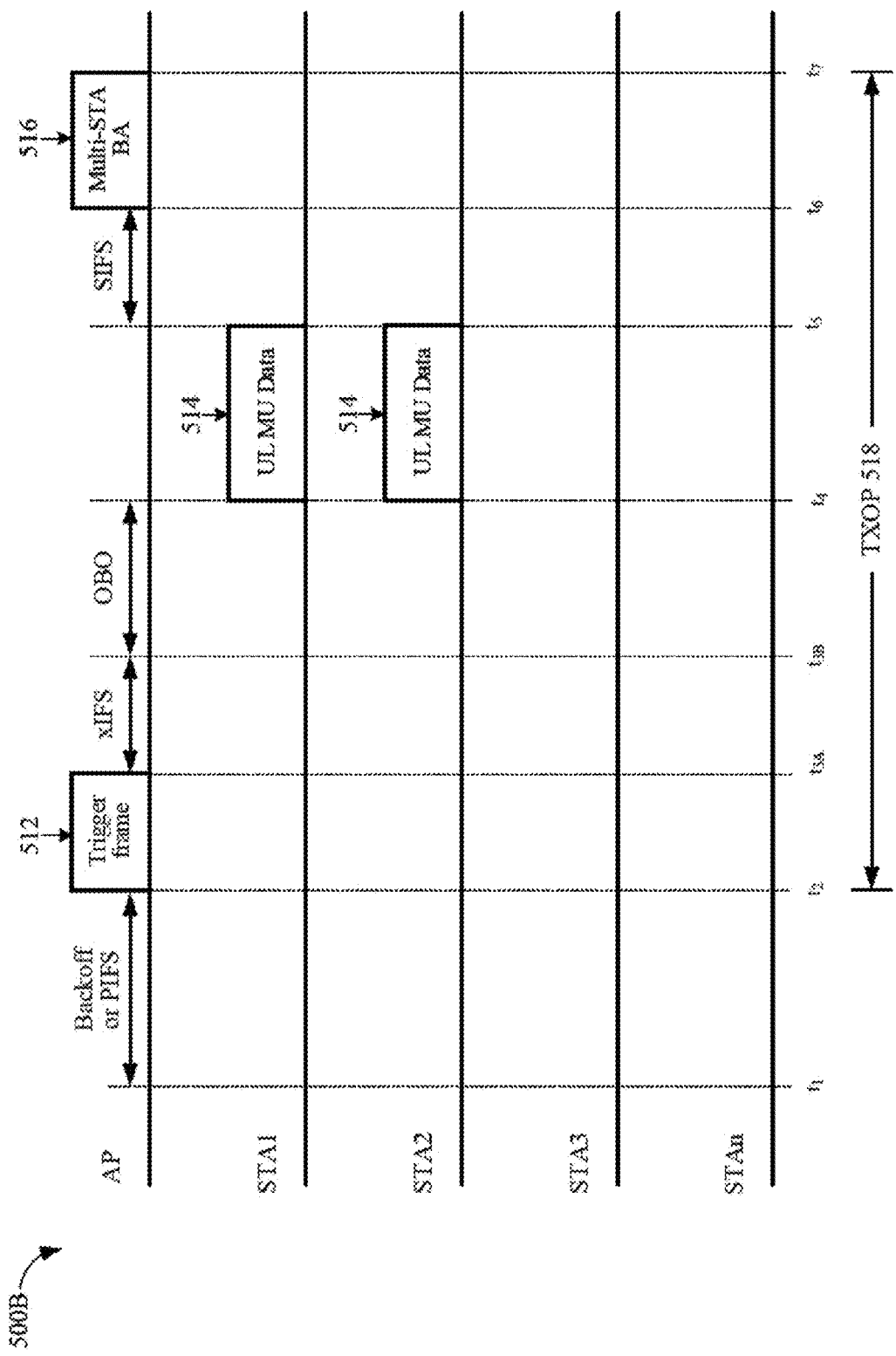
FIG. 5B shows a sequence diagram depicting an example allocation of random RUs to a number of wireless stations.

FIG. 5B shows a sequence diagram 500B depicting an example allocation of random RUs. The AP of FIG. 5B may be any suitable AP including, for example, the AP 110 of FIG. 1A, the AP 110 of FIG. 1B, or the AP 300 of FIG. 3. Each of the wireless stations STA1-STAn may be any suitable wireless station including, for example, the stations STA1-STA4 of FIG. 1A, the sets of stations STA1-STA4 of FIG. 1B, or the STA 200 of FIG. 2.

In some implementations, the AP may contend for medium access during a backoff period or a PIFS duration. In other implementations, the AP may contend for medium access using another suitable channel access mechanism. In some other implementations, the AP may utilize a multiple channel access mechanism.

The AP gains access to the wireless medium at time $t_2$, and may transmit a wildcard trigger frame 512 to the stations STA1-STAn on the DL channel. Time $t_2$ may indicate a beginning of a transmit opportunity (TXOP) 518. The wildcard trigger frame 512 may allocate one or more random RUs upon which the stations STA1-STAn may transmit UL MU data to the AP. The stations STA1-STAn may receive the wildcard trigger frame 512 at (or around) time $t_{3A}$, and may contend with each other for access to the allocated random RUs at time $t_{3B}$ (which may be an xIFS duration after time $t_{3A}$). In some aspects, the wildcard trigger frame 512 may be a broadcast frame that allows any receiving wireless device to contend for access to the random RUs allocated by the wildcard trigger frame 512. In other aspects, the wildcard trigger frame 512 may be a multicast frame that allows a selected subset of the stations STA1-STAn to contend for access to the random RUs allocated by the wildcard trigger frame 512.

In some implementations, the stations STA1-STAn may use the DCF or PCF back-off procedure to contend for access to the random RUs. In other implementations, the stations STA1-STAn may use an opportunistic back-off (OBO) procedure to contend for access to the random RUs, for example, as depicted in the example of FIG. 5B. The OBO procedure is a distributed random channel access mechanism for which each STA selects a random back-off number that may be used to select one of the random RUs allocated by the wildcard trigger frame 512. For example, if the AP allocates four random RUs to be shared as contention-based resources, and a given STA selects an OBO value of 3, then the given STA may transmit UL MU data using the third random RU. Conversely, if the given STA selects an OBO value of 5, then the given STA may not use the random RUs to transmit UL data during the TXOP 518 (such as because the four random RUs may be used by STAs that selected OBO values of 1 through 4). After expiration of the TXOP 518, the given STA may update its OBO value from 5 to 1, and then transmit UL MU data using the first random RU during a next TXOP.

For the example of FIG. 5B, stations STA1 and STA2 gain access to the random RUs allocated by the wildcard trigger frame 512 at time $t_4$, and begin transmitting UL MU data 514 to the AP during the TXOP 518. The other stations (such as stations STA3-STAn) may not use the random RUs allocated by the wildcard trigger frame 512 to transmit UL data during the TXOP 518, for example, because their initial OBO values may be greater than the number of random RUs allocated by the wildcard trigger frame 512.

The AP may receive the UL MU data 514 from stations STA1 and STA2 at time $t_5$, and may acknowledge reception of the UL MU data 514 by transmitting acknowledgement (ACK) frames at time $t_6$. In some aspects, the AP may acknowledge reception of the UL MU data 514 by transmitting an MU ACK frame to stations STA1 and STA2. In other aspects, the AP may acknowledge reception of the UL MU data 514 by transmitting a multi-station block acknowledgement (M-BA) frame 516 to stations STA1 and STA2, for example, as depicted in FIG. 5B.

Referring again to FIG. 1B, the AP 110 may create and independently operate a plurality of basic service sets BSS1-BSSn, and each of the basic service sets BSS1-BSSn may include a number of wireless devices (such as the corresponding sets of stations STA1-STA4). In some implementations, the AP 110 may assign each of the example stations (STAs) shown in FIG. 1B to a particular one of the basic service sets BSS1-BSSn based on a number of parameters of one or more of the basic service sets BSS1-BSSn. In some aspects, the number of parameters of a given one of the basic service sets BSS1-BSSn may include one or more of: security parameters of the given BSS, access privileges of the wireless devices associated with or belonging to the given BSS, the types of wireless devices (such as IoT devices, Wi-Fi devices, and so on) associated with or belonging to the given BSS, quality of service (QoS) parameters of the given BSS, delay requirements (such as relatively short delays for voice traffic and relatively long delays for background or best effort traffic) of the wireless devices associated with or belonging to the given BSS, bandwidth capabilities of the wireless devices associated with or belonging to the given BSS (such as narrowband capabilities and wideband capabilities), and any other suitable metric or characteristic that may be used to prioritize the allocation of random RUs to the plurality of basic service sets BSS1-BSSn.

FIG. 5C shows a sequence diagram 500C depicting an example allocation of random RUs to a specific basic service set (BSS). The AP of FIG. 5C may be any suitable AP including, for example, the AP 110 of FIG. 1A, the AP 110 of FIG. 1B, or the AP 300 of FIG. 3. In some aspects, the basic service sets BSS1-BSSn shown in FIG. 5C may be examples of the basic service sets BSS1-BSSn of FIG. 1B. In other aspects, the basic service sets BSS1-BSSn shown in FIG. 5C may be other suitable basic service sets. Although not shown for simplicity, each of the basic service sets BSS1-BSSn shown in FIG. 5C may include or be associated with a number of wireless devices (such as the STAs of FIG. 1A, the sets of STAs of FIG. 1B, the STA 200 of FIG. 2, or any other suitable wireless devices capable of wirelessly communicating with the AP.

In some implementations, the AP may contend for medium access during a backoff period or a point coordination function (PCF) interframe space (PIFS) duration (such as between times $t_1$ and $t_2$). In other implementations, the AP may contend for medium access using another suitable channel access mechanism. In some other implementations, the AP may utilize a multiple channel access mechanism, for example, and may not contend for medium access.

The AP gains access to the wireless medium at time $t_2$, and may transmit a trigger frame 522 to the sets of stations STA1-STAn belonging to respective basic service sets BSS1-BSSn on a DL channel. Time $t_2$ may indicate a beginning of a transmit opportunity (TXOP) 528. The trigger frame 522 may allocate one or more random RUs to each of a selected number of the plurality of basic service sets BSS1-BSSn, for example, so that the wireless devices associated with or belonging to the selected BSSs may transmit UL data to the AP (or to other devices) using the random RUs allocated by the trigger frame 522. In some implementations, the trigger frame 522 may contain one or more values identifying the selected BSSs, and may indicate the size and location of the random RUs allocated to each of the selected BSSs. In some aspects, each of the values may be an AID having a value set to the BSSID of a corresponding one of the selected BSSs. Thus, rather than identifying a particular wireless station to which one or more random RUs are allocated, each AID provided in the trigger frame 522 may identify a particular BSS to which one or more random RUs are allocated. The selected number of BSSs may be a subset of the BSSs operated or controlled by the AP, for example, so that the random RUs allocated by the AP are not available to all BSSs operated or controlled by the AP.

In some aspects, the trigger frame 522 may be a broadcast frame that allows any wireless devices associated with or belonging to the selected BSSs to contend for access to the random RUs allocated by the trigger frame 522. In other aspects, the trigger frame 522 may be a multicast frame that allows a group of wireless devices associated with or belonging to the selected BSSs to contend for access to the random RUs allocated by the trigger frame 522.

The wireless devices within range of the AP 110 may receive the trigger frame 522 at (or around) time $t_{3A}$. Each of the wireless devices that receives the trigger frame 522 may decode the AID value included in the trigger frame 522 to determine whether the BSS to which the wireless device belongs is selected for an allocation of random RUs. In some implementations, if a given wireless device determines that the AID value included in the trigger frame 522 matches the BSSID of its BSS, then the given wireless device may contend for access to the random RUs allocated by the trigger frame 522. Conversely, if a given wireless device determines that the AID value included in the trigger frame 522 does not match the BSSID of its BSS, then the given wireless device may not contend for access to the random RUs allocated by the trigger frame 522.

For the example of FIG. 5C, the AP 110 selects the first basic service sets BSS1 for allocation of the random RUs, and the AID value stored in the trigger frame 522 is set to the BSSID of the first basic service set BSS1 (such as AID=BSSID1). Because the stations STA1(1)-STA4(1) belong to the first basic service set BSS1, the stations STA1(1)-STA4(1) may contend with each other for access to the random RUs allocated by the trigger frame 522 at time $t_{3B}$ (which may be an xIFS duration after time $t_{3A}$). Stations that do not belong to the selected BSS may not contend for access to the random RUs allocated by the trigger frame 522. Thus, because the sets of stations STA1(2)-STA4(2) through STA1(n)-STA4(n) belong to non-selected basic service sets BSS2 through BSSn, respectively, these sets of stations may not contend for access to the random RUs allocated by the trigger frame 522. In some aspects, stations that do not belong to the selected BSS may return to a power save state.

The first station STA1(1) of the selected basic service set BSS1 is depicted as gaining access to the wireless medium (after a backoff period between times $t_{3B}$ and $t_4$), and may begin transmitting UL data on the random RU allocated by the trigger frame 522 at time $t_4$. In some aspects, the first station STA1(1) may use the random RU to transmit UL data within first basic service set BSS1. In other aspects, the first station STA1(1) may use the random RU to transmit UL data to wireless devices belonging to other basic service sets.

The AP may receive the UL MU data 524 from the first station STA1(1) at time $t_5$, and may acknowledge reception of the UL MU data 524 by transmitting an ACK frame to the first station STA1(1) at time $t_6$. In some aspects, the AP may acknowledge reception of the UL MU data 524 by transmitting an MU ACK frame to the first station STA1(1). In other aspects, the AP may acknowledge reception of the UL MU data 524 by transmitting a multi-station block acknowledgement (M-BA) frame 526 to the first station STA1(1), for example, as depicted in FIG. 5C.

Allocating random RUs to a selected BSS (such as rather than allocating random RUs to wireless devices within any or all BSSs controlled or operated by the AP) may increase medium utilization and efficiency. For one example, if a first BSS includes 100 wireless devices and a second BSS includes 3 wireless devices, then allocating random RUs to all wireless devices associated with the AP may result in the wireless devices belonging to the second BSS receiving a disproportionate share of the random RUs allocated by the AP. Thus, by allocating random RUs to wireless devices belonging to the first BSS (rather than to wireless devices belonging to all BSSs operated or controlled by the AP), the AP may prioritize the allocation of random RUs based on the number of wireless devices that belong to the first BSS. In other words, because more wireless devices belong to the first BSS than to the second BSS, the AP may allocate more random RUs to the first BSS than to the second BSS (or may allocate random RUs to the first BSS more frequently than to the second BSS).

For another example, if a first BSS includes 4 smartphones that frequently implement VoIP calls and a second BSS includes 10 IoT devices (such as smart sensors), then allocating random RUs to all wireless devices associated with the AP using conventional RU allocation techniques may result in allocations of random RUs to sensor devices (which typically do not have delay-critical traffic) that would otherwise be available to facilitate VoIP calls and other real-time traffic corresponding to the first BSS. Thus, by allocating random RUs to the 4 smartphones belonging to the first BSS (and not to the 10 IoT devices belonging to the second BSS), the AP may prioritize the allocation of random RUs based on traffic classes and delay or latency requirements.

Figure 6:
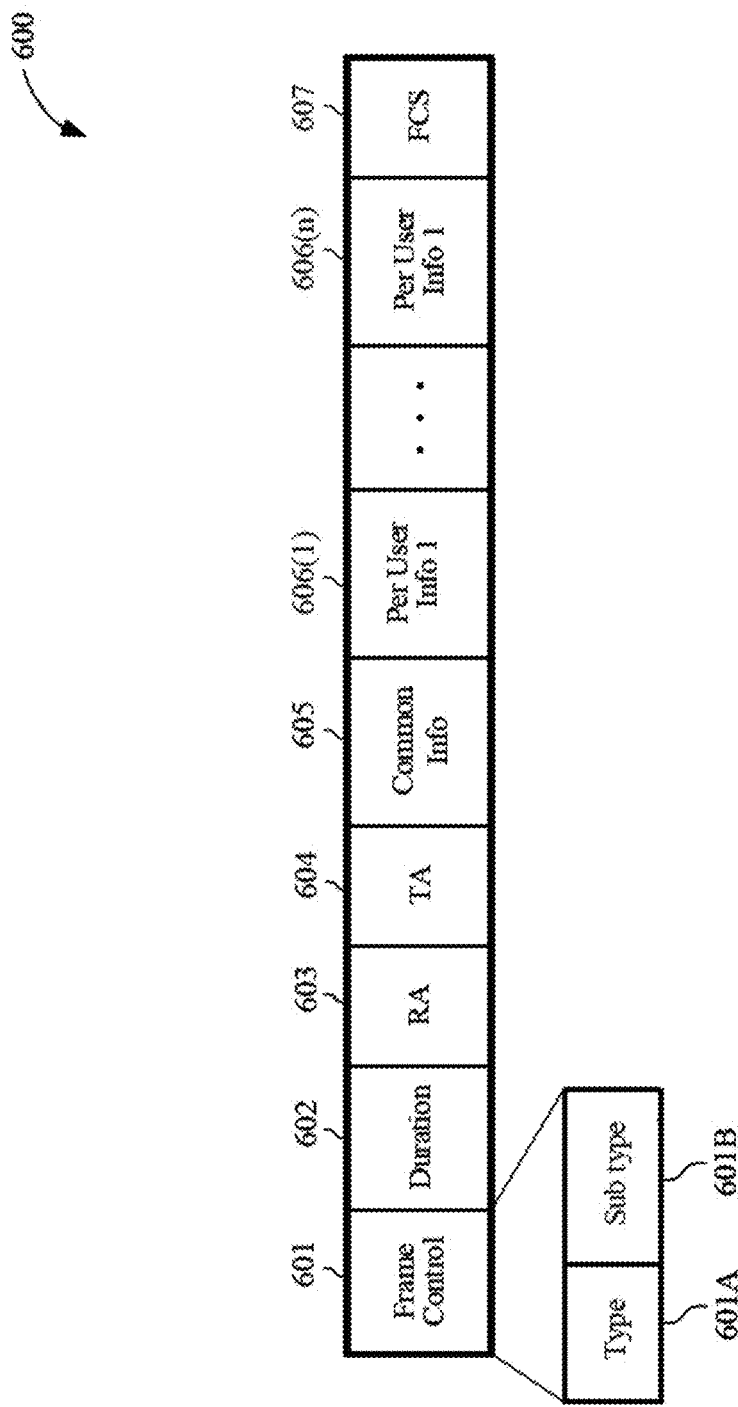
FIG. 6 shows an example trigger frame.

FIG. 6 shows an example trigger frame 600. The trigger frame 600 may be used as the directed trigger frame 502 of FIG. 5A, the wildcard trigger frame 512 of FIG. 5B, and the trigger frame 522 of FIG. 5C. The trigger frame 600 is shown to include a frame control field 601, a duration field 602, a receiver address (RA) field 603, a transmitter address (TA) field 604, a Common Info field 605, a number of Per User Info fields 606(1)-606(n), and a frame check sequence (FCS) field 607.

The frame control field 601 includes a Type field 601A and a Sub-type field 601B. The Type field 601A may store a value to indicate that the trigger frame 600 is a control frame, and the Sub-type field 601B may store a value indicating a type of the trigger frame 600. The duration field 602 may store information indicating a duration or length of the trigger frame 600. The RA field 603 may store the address of a receiving device (such as one of the wireless stations STA1-STAn of FIG. 5A). The TA field 604 may store the address of a transmitting device (such as the AP of FIG. 5A). The Common Info field 605 may store information common to one or more receiving devices, as described in more detail below with respect to FIG. 7A. Each of the Per User Info fields 606(1)-606(n) may store information for a particular receiving device, as described in more detail below with respect to FIG. 7B. The FCS field 607 may store a frame check sequence (such as for error detection).

FIG. 7A shows an example Common Info field 700. The Common Info field 700 may be one implementation of the Common Info field 605 of the trigger frame 600. The Common Info field 700 is shown to include a length subfield 701, a cascade indication subfield 702, a high-efficiency signaling A (HE-SIG-A) info subfield 703, a cyclic prefix (CP) and legacy training field (LTF) type subfield 704, a trigger type subfield 705, and a trigger-dependent common info subfield 706. The length subfield 701 may indicate the length of a legacy signaling field of the UL data frames to be transmitted in response to the trigger frame 600. The cascade indication subfield 702 may indicate whether a subsequent trigger frame follows the current trigger frame. The HE-SIG-A Info subfield 703 may indicate the contents of a HE-SIG-A field of the UL data frames to be transmitted in response to the trigger frame 600. The CP and LTF type subfield 704 may indicate the cyclic prefix and HE-LTF type of the UL data frames to be transmitted in response to the trigger frame 600. The trigger type subfield 705 may indicate the type of trigger frame. The trigger-dependent common info subfield 706 may indicate trigger-dependent information.

FIG. 7B shows an example Per User Info field 710. The Per User Info field 710 may be one implementation of the Per User Info fields 606(1)-606(n) of the trigger frame 600. The Per User Info field 710 is shown to include a User Identifier subfield 711, an RU Allocation subfield 712, a Coding Type subfield 713, an MCS subfield 714, a dual-carrier modulation (DCM) subfield 715, a spatial stream (SS) Allocation subfield 716, and a trigger-dependent Per User info subfield 717. The User Identifier subfield 711 may indicate the association identification (AID) of the STA to which a dedicated RU is allocated for transmitting UL MU data. The RU Allocation subfield 712 may identify the dedicated RU allocated to the corresponding STA (such as the STA identified by the User Identifier subfield 711). The Coding Type subfield 713 may indicate the type of coding to be used by the corresponding STA when transmitting UL data using the allocated RU. The MCS subfield 714 may indicate the MCS to be used by the corresponding STA when transmitting UL data using the allocated RU. The DCM subfield 715 may indicate the dual carrier modulation to be used by the corresponding STA when transmitting UL data using the allocated RU. The SS Allocation subfield 716 may indicate the number of spatial streams to be used by the corresponding STA when transmitting UL data using the allocated RU.

In some implementations, the value of the AID stored in the User Identifier subfield 711 of the Per User Info field 710 of the trigger frame 600 may indicate or identify the selected BSS to which random RUs identified in the RU Allocation subfield 712 are allocated. In some aspects, the AID stored in the User Identifier subfield 711 may be one of a number (N) of values, for example, to identify a corresponding one of N different BSSs to which one or more random RUs are allocated by the trigger frame 600. For one example in which the AP operates a number N=8 of independent BSSs, AID values of 0-7 may be used by the trigger frame 600 to identify a selected one of eight (8) BSSs to which the random RUs are allocated by the trigger frame 600. Thus, if the trigger frame 600 stores a value AID=1, then all wireless devices associated with or belonging to a BSS having a BSSID=1 (such as the first basic service set BSS1 of FIG. 1B) may contend for access to the random RUs allocated by the trigger frame 600; if the trigger frame 600 stores a value AID=2, then all wireless devices associated with or belonging to a BSS having a BSSID=2 (such as the second basic service set BSS2 of FIG. 1B) may contend for access to the random RUs allocated by the trigger frame 600; and so on.

Mappings between BSSs and AID values may be stored in the AP, for example, as described above with respect to FIG. 3. The AP may share the mappings between BSSs and AID values with its associated wireless devices. In some implementations, the AP may transmit a multiple BSSID set element that includes the mappings between BSSs and AID values. In some aspects, the AP may transmit the multiple BSSID set element in beacon frames broadcast to its associated devices. In other aspects, the AP may transmit the multiple BSSID set element in trigger frames. The multiple BSSID set element may be included in an information element (IE), in a vendor-specific information element (VSIE), in a packet extension, or in any other suitable portion or field of the beacon frames or trigger frames.

Figure 8:
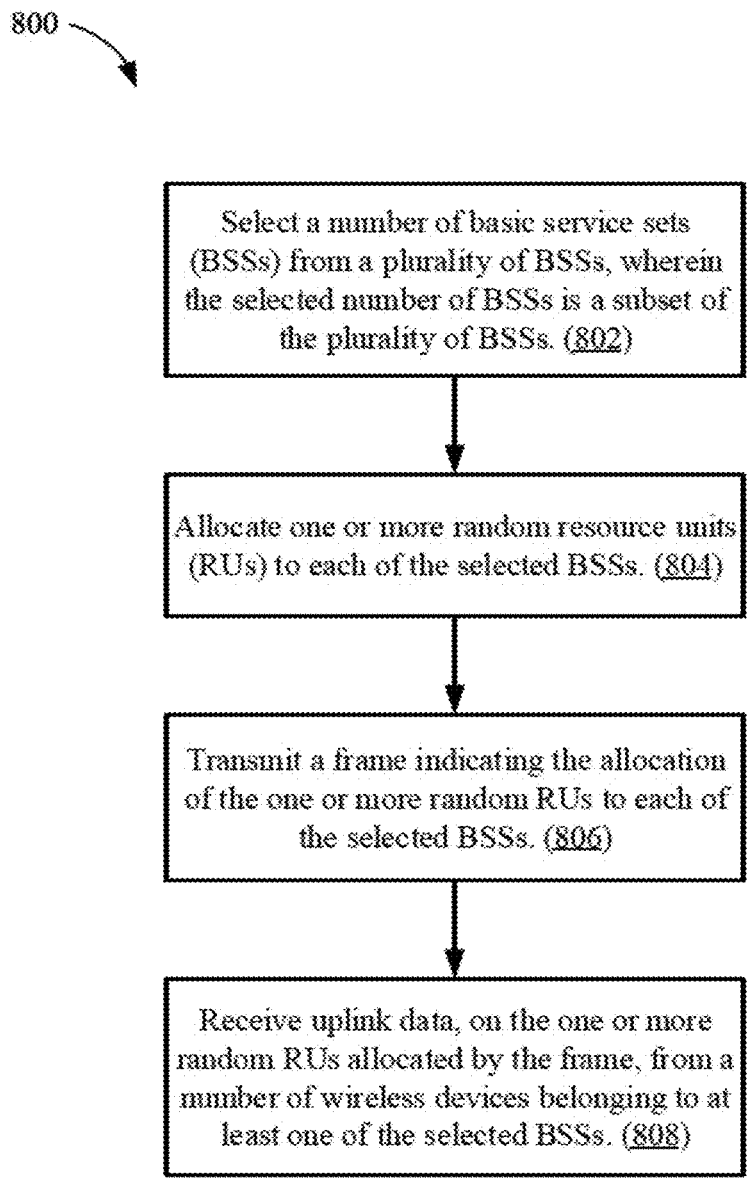
FIG. 8 shows an illustrative flow chart depicting an example operation for allocating random RUs to a selected basic service set (BSS).

FIG. 8 shows an illustrative flow chart depicting an example operation 800 for allocating random RUs to a selected number of basic service sets (BSSs) operated by an AP, in accordance with aspects of the present disclosure. The AP may be the AP 110 of FIG. 1A, the AP of FIG. 1B, or the AP 300 of FIG. 3.

First, the AP selects a number of basic service sets (BSSs) from a plurality of BSSs, wherein the selected number of BSSs is a subset of the plurality of BSSs (802). In some aspects, the AP may base the selection of the BSS(s) on at least one of: security parameters of the plurality of BSSs, access privileges of wireless devices belonging to the plurality of BSSs, types of wireless devices belonging to the plurality of BSSs, quality of service (QoS) parameters of the plurality of BSSs, and delay requirements of wireless devices belonging to the plurality of BSSs.

Then, the AP allocates one or more random resource units (RUs) to each of the selected BSSs (804). In some implementations, the one or more random RUs may be contention-based resources that are to be shared by a number of wireless devices belonging to a corresponding one of the selected BSSs. In some aspects, a size of the one or more random RUs may be based, at least in part, on a bandwidth of the wireless devices belonging to the corresponding one of the selected BSSs.

Next, the AP transmits a frame indicating the allocation of the one or more random RUs to each of the selected BSSs (806). In some implementations, the frame may be a trigger frame that includes one or more AID values that identify the selected BSSs. In some aspects, the AID values may be stored in a per user information field of the trigger frame. In other aspects, the AID values may be stored in another suitable portion or field of the trigger frame.

Thereafter, the AP receives uplink data, on the one or more random RUs allocated by the frame, from a number of wireless devices belonging to at least one of the selected BSSs (808). In this manner, the wireless devices belonging to the at least one of the selected BSSs may use the random RUs without contending with wireless devices belonging to non-selected BSSs.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various illustrative logics, logical blocks, modules, circuits and algorithm processes described in connection with the implementations disclosed herein may be implemented as electronic hardware, computer software, or combinations of both. The interchangeability of hardware and software has been described generally, in terms of functionality, and illustrated in the various illustrative components, blocks, modules, circuits and processes described above. Whether such functionality is implemented in hardware or software depends upon the particular application and design constraints imposed on the overall system.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, or, any conventional processor, controller, microcontroller, or state machine. A processor also may be implemented as a combination of computing devices such as, for example, a combination of a DSP and a microprocessor, a plurality of microprocessors, one or more microprocessors in conjunction with a DSP core, or any other such configuration. In some implementations, particular processes and methods may be performed by circuitry that is specific to a given function.

In one or more aspects, the functions described may be implemented in hardware, digital electronic circuitry, computer software, firmware, including the structures disclosed in this specification and their structural equivalents thereof, or in any combination thereof. Implementations of the subject matter described in this specification also can be implemented as one or more computer programs, i.e., one or more modules of computer program instructions, encoded on a computer storage media for execution by, or to control the operation of, data processing apparatus.

If implemented in software, the functions may be stored on or transmitted over as one or more instructions or code on a computer-readable medium. The processes of a method or algorithm disclosed herein may be implemented in a processor-executable software module which may reside on a computer-readable medium. Computer-readable media includes both computer storage media and communication media including any medium that can be enabled to transfer a computer program from one place to another. A storage media may be any available media that may be accessed by a computer. By way of example, and not limitation, such computer-readable media may include RAM, ROM, EEPROM, CD-ROM or other optical disk storage, magnetic disk storage or other magnetic storage devices, or any other medium that may be used to store desired program code in the form of instructions or data structures and that may be accessed by a computer. Also, any connection can be properly termed a computer-readable medium. Disk and disc, as used herein, includes compact disc (CD), laser disc, optical disc, digital versatile disc (DVD), floppy disk, and blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and instructions on a machine readable medium and computer-readable medium, which may be incorporated into a computer program product.

Various modifications to the implementations described in this disclosure may be readily apparent to those skilled in the art, and the generic principles defined herein may be applied to other implementations without departing from the spirit or scope of this disclosure. Thus, the claims are not intended to be limited to the implementations shown herein, but are to be accorded the widest scope consistent with this disclosure, the principles and the novel features disclosed herein.

What is claimed is:

1. A method performed by an access point (AP), comprising:
    selecting a number of basic service sets (BSSs) from a plurality of BSSs, wherein the selected number of BSSs is a subset of the plurality of BSSs;
    allocating one or more random resource units (RUs) to each of the selected BSSs; and
    transmitting a frame indicating the allocation of the one or more random RUs to each of the selected BSSs.

2. The method of claim 1, wherein each of the plurality of BSSs is operated by the AP.

3. The method of claim 1, wherein the frame comprises a trigger frame containing one or more values that identify the selected BSSs.

4. The method of claim 3, wherein each of the values comprises an association identification (AID) identifying a corresponding one of the selected BSSs, and the AID is stored in a per user information field of the trigger frame.

5. The method of claim 4, wherein the AID comprises a number (N) of values ranging from 0 to N-1 each identifying a corresponding one of N independent BSSs, wherein N is an integer greater than one.

6. The method of claim 1, wherein the one or more random RUs comprise contention-based resources to be shared only by wireless devices belonging to the selected BSSs.

7. The method of claim 1, wherein a size of the one or more random RUs is based at least in part on a bandwidth of a number of wireless devices belonging to the selected BSSs.

8. The method of claim 1, wherein selecting the number of BSSs is based on at least one of: security parameters of the plurality of BSSs, access privileges of wireless devices belonging to the plurality of BSSs, types of wireless devices belonging to the plurality of BSSs, quality of service (QoS) parameters of the plurality of BSSs, and delay requirements of wireless devices belonging to the plurality of BSSs.

9. The method of claim 1, further comprising:
receiving uplink data, on the one or more random RUs allocated by the frame, from a number of wireless devices belonging to at least one of the selected BSSs.

10. An access point (AP), comprising:
one or more processors; and
a memory storing instructions that, when executed by the one or more processors, cause the AP to:
select a number of basic service sets (BSSs) from a plurality of BSSs, wherein the selected number of BSSs is a subset of the plurality of BSSs;
allocate one or more random resource units (RUs) to each of the selected BSSs; and
transmit a frame indicating the allocation of the one or more random RUs to each of the selected BSSs.

11. The AP of claim 10, wherein each of the plurality of BSSs is operated by the AP.

12. The AP of claim 10, wherein the frame comprises a trigger frame containing one or more values that identify the selected BSSs.

13. The AP of claim 12, wherein each of the values comprises an association identification (AID) identifying a corresponding one of the selected BSSs, and the AID is stored in a per user information field of the trigger frame.

14. The AP of claim 13, wherein the AID comprises a number (N) of values ranging from 0 to N-1 each identifying a corresponding one of N independent BSSs, wherein N is an integer greater than one.

15. The AP of claim 10, wherein the one or more random RUs comprise contention-based resources to be shared only by wireless devices belonging to the selected BSSs.

16. The AP of claim 10, wherein a size of the one or more random RUs is based at least in part on a bandwidth of a number of wireless devices belonging to the selected BSSs.

17. The AP of claim 10, wherein selecting the number of BSSs is based on at least one of: security parameters of the plurality of BSSs, access privileges of wireless devices belonging to the plurality of BSSs, types of wireless devices belonging to the plurality of BSSs, quality of service (QoS) parameters of the plurality of BSSs, and delay requirements of wireless devices belonging to the plurality of BSSs.

18. The AP of claim 10, wherein execution of the instructions causes the AP to further:
receive uplink data, on the one or more random RUs allocated by the frame, from a number of wireless devices belonging to at least one of the selected BSSs.

19. A non-transitory computer-readable medium comprising instructions that, when executed by one or more processors of an access point (AP), cause the AP to perform operations comprising:
selecting a number of basic service sets (BSSs) from a plurality of BSSs, wherein the selected number of BSSs is a subset of the plurality of BSSs;
allocating one or more random resource units (RUs) to each of the selected BSSs; and
transmitting a frame indicating the allocation of the one or more random RUs to each of the selected BSSs.

20. The non-transitory computer-readable medium of claim 19, wherein each of the plurality of BSSs is operated by the AP.

21. The non-transitory computer-readable medium of claim 19, wherein the frame comprises a trigger frame containing one or more values that identify the selected BSSs.

22. The non-transitory computer-readable medium of claim 21, wherein each of the values comprises an association identification (AID) identifying a corresponding one of the selected BSSs, and the AID is stored in a per user information field of the trigger frame.

23. The non-transitory computer-readable medium of claim 22, wherein the AID comprises a number (N) of values ranging from 0 to N-1 each identifying a corresponding one of N independent BSSs, wherein N is an integer greater than one.

24. The non-transitory computer-readable medium of claim 19, wherein the one or more random RUs comprise contention-based resources to be shared only by wireless devices belonging to the selected BSSs.

25. The non-transitory computer-readable medium of claim 19, wherein a size of the one or more random RUs is based at least in part on a bandwidth of a number of wireless devices belonging to the selected BSSs.

26. The non-transitory computer-readable medium of claim 19, wherein selecting the number of BSSs is based on at least one of: security parameters of the plurality of BSSs, access privileges of wireless devices belonging to the plurality of BSSs, types of wireless devices belonging to the plurality of BSSs, quality of service (QoS) parameters of the plurality of BSSs, and delay requirements of wireless devices belonging to the plurality of BSSs.

27. The non-transitory computer-readable medium of claim 19, wherein execution of the instructions causes the AP to perform operations further comprising:
receiving uplink data, on the one or more random RUs allocated by the frame, from a number of wireless devices belonging to at least one of the selected BSSs.

28. An apparatus, comprising:
means for selecting a number of basic service sets (BSSs) from a plurality of BSSs, wherein the selected number of BSSs is a subset of the plurality of BSSs;
means for allocating one or more random resource units (RUs) to each of the selected BSSs; and
means for transmitting a frame indicating the allocation of the one or more random RUs to each of the selected BSSs.

29. The apparatus of claim 28, wherein the frame comprises a trigger frame containing one or more values that identify the selected BSSs, and each of the values comprises an association identification (AID) identifying a corresponding one of the selected BSSs.

30. The apparatus of claim 28, wherein the one or more random RUs comprise contention-based resources to be shared only by wireless devices belonging to the selected BSSs.

* * * * *